United States Patent
Sinyavskiy et al.

(10) Patent No.: US 9,104,186 B2
(45) Date of Patent: *Aug. 11, 2015

(54) STOCHASTIC APPARATUS AND METHODS FOR IMPLEMENTING GENERALIZED LEARNING RULES

(75) Inventors: Oleg Sinyavskiy, San Diego, CA (US); Olivier J. M. D. Coenen, San Diego, CA (US)

(73) Assignee: BRAIN CORPORATION, San Diego, CA (US)

(*) Notice: Subject to any disclaimer, the term of this patent is extended or adjusted under 35 U.S.C. 154(b) by 441 days.

This patent is subject to a terminal disclaimer.

(21) Appl. No.: 13/487,499

(22) Filed: Jun. 4, 2012

(65) Prior Publication Data

US 2013/0325773 A1    Dec. 5, 2013

(51) Int. Cl.
| | |
|---|---|
| *G06F 15/18* | (2006.01) |
| *G05B 13/02* | (2006.01) |
| *G06N 3/04* | (2006.01) |
| *G06N 99/00* | (2010.01) |

(52) U.S. Cl.
CPC .............. *G05B 13/027* (2013.01); *G06N 3/049* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 5,063,603 A | 11/1991 | Burt | |
| 5,092,343 A | 3/1992 | Spitzer | |
| 5,245,672 A | 9/1993 | Wilson | |
| 5,355,435 A | 10/1994 | DeYong | |
| 5,388,186 A | 2/1995 | Bose | |
| 5,408,588 A | 4/1995 | Ulug | |
| 5,467,428 A | 11/1995 | Ulug | |
| 5,638,359 A | 6/1997 | Peltola | |
| 5,673,367 A | 9/1997 | Buckley | |
| 5,875,108 A | 2/1999 | Hoffberg | |
| 6,009,418 A | 12/1999 | Cooper | |
| 6,014,653 A | 1/2000 | Thaler | |

(Continued)

FOREIGN PATENT DOCUMENTS

| | | |
|---|---|---|
| CN | 102226740 | 10/2011 |
| EP | 1089436 | 4/2001 |

(Continued)

OTHER PUBLICATIONS

Bennett (1999), The early history of the synapse: from Plato to Sherrington. Brain Res. Bull., 50(2): 95-118.

(Continued)

*Primary Examiner* — Kakali Chaki
*Assistant Examiner* — Michael Zidanic
(74) *Attorney, Agent, or Firm* — Gazdzinski & Associates, PC

(57) ABSTRACT

Generalized learning rules may be implemented. A framework may be used to enable adaptive signal processing system to flexibly, combine different learning rules (supervised, unsupervised, reinforcement learning) with different methods (online or batch learning). The generalized learning framework may employ time-averaged performance function as the learning measure thereby enabling modular architecture where learning tasks are separated from control tasks, so that changes in one of the modules do not necessitate changes within the other. The generalized learning apparatus may be capable of implementing several learning rules concurrently based on the desired control application and without requiring users to explicitly identify the required learning rule composition for that application.

23 Claims, 20 Drawing Sheets

(56) References Cited

U.S. PATENT DOCUMENTS

| | | |
|---|---|---|
| 6,363,369 B1 | 3/2002 | Liaw |
| 6,458,157 B1 | 10/2002 | Suaning |
| 6,545,705 B1 | 4/2003 | Sigel |
| 6,545,708 B1 | 4/2003 | Tamayama |
| 6,546,291 B2 | 4/2003 | Merfeld |
| 6,581,046 B1 | 6/2003 | Ahissar |
| 6,601,049 B1 | 7/2003 | Cooper |
| 6,643,627 B2 | 11/2003 | Liaw |
| 7,395,251 B2 | 7/2008 | Linsker |
| 7,426,501 B2 | 9/2008 | Nugent |
| 7,672,920 B2 | 3/2010 | Ito |
| 7,849,030 B2 | 12/2010 | Ellingsworth |
| 8,015,130 B2 | 9/2011 | Matsugu |
| 8,103,602 B2 | 1/2012 | Izhikevich |
| 8,315,305 B2 | 11/2012 | Petre |
| 8,467,623 B2 | 6/2013 | Izhikevich |
| 8,655,815 B2 | 2/2014 | Palmer |
| 2002/0038294 A1 | 3/2002 | Matsugu |
| 2003/0050903 A1 | 3/2003 | Liaw |
| 2004/0193670 A1 | 9/2004 | Langan |
| 2005/0015351 A1 | 1/2005 | Nugent |
| 2005/0036649 A1 | 2/2005 | Yokono |
| 2005/0283450 A1 | 12/2005 | Matsugu |
| 2006/0161218 A1 | 7/2006 | Danilov |
| 2007/0022068 A1 | 1/2007 | Linsker |
| 2007/0176643 A1 | 8/2007 | Nugent |
| 2007/0208678 A1 | 9/2007 | Matsugu |
| 2008/0024345 A1 | 1/2008 | Watson |
| 2008/0162391 A1 | 7/2008 | Izhikevich |
| 2009/0043722 A1 | 2/2009 | Nugent |
| 2009/0287624 A1 | 11/2009 | Rouat |
| 2010/0086171 A1 | 4/2010 | Lapstun |
| 2010/0166320 A1 | 7/2010 | Paquier |
| 2010/0198765 A1 | 8/2010 | Fiorillo |
| 2011/0016071 A1 | 1/2011 | Guillen |
| 2011/0119214 A1 | 5/2011 | Breitwisch |
| 2011/0119215 A1 | 5/2011 | Elmegreen |
| 2011/0160741 A1 | 6/2011 | Asano |
| 2012/0011090 A1 | 1/2012 | Tang |
| 2012/0011093 A1 | 1/2012 | Aparin |
| 2012/0036099 A1 | 2/2012 | Venkatraman |
| 2012/0109866 A1 | 5/2012 | Modha |
| 2012/0303091 A1 | 11/2012 | Izhikevich |
| 2012/0308076 A1 | 12/2012 | Piekniewski |
| 2012/0308136 A1 | 12/2012 | Izhikevich |
| 2013/0073080 A1 | 3/2013 | Ponulak |
| 2013/0073491 A1 | 3/2013 | Izhikevich |
| 2013/0073493 A1 | 3/2013 | Modha |
| 2013/0073496 A1 | 3/2013 | Szatmary |
| 2013/0073500 A1 | 3/2013 | Szatmary |
| 2013/0151448 A1 | 6/2013 | Ponulak |
| 2013/0151449 A1 | 6/2013 | Ponulak |
| 2013/0151450 A1 | 6/2013 | Ponulak |
| 2013/0204820 A1 | 8/2013 | Hunzinger |
| 2013/0218821 A1 | 8/2013 | Szatmary |
| 2013/0251278 A1 | 9/2013 | Izhikevich |
| 2013/0297541 A1 | 11/2013 | Piekniewski |
| 2013/0325766 A1 | 12/2013 | Petre |
| 2013/0325768 A1 | 12/2013 | Sinyavskiy |
| 2013/0325773 A1 | 12/2013 | Sinyavskiy |
| 2013/0325774 A1 | 12/2013 | Sinyavskiy |
| 2013/0325775 A1 | 12/2013 | Sinyavskiy |
| 2013/0325776 A1 | 12/2013 | Ponulak |
| 2013/0325777 A1 | 12/2013 | Petre |
| 2014/0016858 A1 | 1/2014 | Richert |
| 2014/0025613 A1 | 1/2014 | Ponulak |
| 2014/0032458 A1 | 1/2014 | Sinyavskiy |
| 2014/0193066 A1 | 7/2014 | Richert |

FOREIGN PATENT DOCUMENTS

| | | |
|---|---|---|
| JP | 4087423 | 3/1992 |
| RU | 2108612 C1 | 10/1998 |
| RU | 2406105 C2 | 12/2010 |
| WO | 2008083335 | 7/2008 |
| WO | 2008132066 A1 | 11/2008 |

OTHER PUBLICATIONS

Haykin, (1999), Neural Networks: A Comprehensive Foundation (Second Edition), Prentice-Hall.

"In search of the artificial retina" [online], Vision Systems Design, Apr. 1, 2007.

Kenji, (2000), Reinforcement Learning in Continuous Time and Space, Neural Computation, 12:1, 219-245.

Klute et al., (2002). Artificial Muscles: Actuators for Biorobotic Systems. The International Journal 0./ Robotics Research 21 :295-309.

Lendek et al., (2006) State Estimation under Uncertainty: A Survey. Technical report 06-004, Delft Center for Systems and Control Delft University of Technology.

Legenstein et al., (2008), A learning theory for reward-modulated spike timing-dependent plasticity with application to biofeedback. PLoS Computational Biology, 4(10): 1-27.

Nikolic et al., (2011) High-sensitivity silicon retina for robotics and prosthetics.

Ponulak, (2005), ReSuMe—New supervised learning method for Spiking Neural Networks. Technical Report, Institute of Control and Information Engineering, Poznan University of Technology.

Ponulak et al., (2010) Supervised Learning in Spiking Neural Networks with ReSuMe: Sequence Learning, Classification and Spike-Shifting. Neural Comp., 22 (2): 467-510.

Sutton et al., (1998), Reinforcement Learning, an Introduction. MIT Press.

Schreiber et al., (2003), A new correlation-based measure of spike timing reliability. Neurocomputing, 52-54, 925-931.

Sutton, (1988). Learning to predict by the methods of temporal differences. Machine Learning 3(1), 9-44.

Stein, (1967). Some models of neural variability. Biophys. J., 7: 37-68.

Werbos, (1992), or Prokhorov D.V and Wunsch D.C. (1997) Adaptive Critic Designs, IEEE Trans Neural Networks, vol. 8, No. 5, pp. 997-1007.

White et al., (Eds.) (1992) Handbook of Intelligent Control: Neural, Fuzzy and Adaptive Approaches. Van Nostrand Reinhold, New York.

Widrow et al., (1960) Adaptive Switching Circuits. IRE WESCON Convention Record 4: 96-104.

Ponulak (2006) Supervised Learning in Spiking Neural Networks with ReSuMe Method. Doctoral Dissertation Poznan, Poland.

Florian (2007) Reinforcement Learning Through Modulation of Spike-Timing-Dependent Synaptic Plasticity, Neural Computation 19, 1468-1502 Massachusetts Institute of Technology.

Morrison, (2008)Phenomenological models of synaptic plasticity based on spike timing, Received: Jan. 16, 2008 / Accepted: Apr. 9, 2008 The Author(s).

Bouganis et al., (2010) "Training a Spiking Neural Network to Control a 4-DoF Robotic Arm based on Spike Timing-Dependent Plasticity", Proceedings of WCCI201 0 IEEE World Congress on Computational Intelligence, CCIB, Barcelona, Spain, Jul. 18-23, 2010, pp. 4104-4111.

Xie et al., (2004) "Learning in neural networks by reinforcement of irregular spiking", Physical Review E, vol. 69, letter 041909, pp. 1-10.

Floreano et al., (2008) Floreano et al. Neuroevolution: From Architectures to learning Evol. Intel. Jan. 2008 1:47-62 (retrieved online on Apr. 24, 2013 from http://infoscience.epfl.ch/record/112676/files/FloreanoDuerrMattiussi2008pdf).

D'Cruz (1998) Reinforcement Learning in Intelligent Control: A Biologically-Inspired Inspired Approach to the Re/earning Problem Brendan May 1998.

Bohte, 'Spiking Nueral Networks' Doctorate at the University of Leiden, Holland, Mar. 5, 2003, pp. 1-133 [retrieved on Nov. 14, 2012]. Retrieved from the internet: <URL: http://holnepagcs, cwi ,n11-sbolltedmblica6ond)hdthesislxif>.

(56) References Cited

OTHER PUBLICATIONS

Brette et al., Brian: a simple and flexible simulator for spiking neural networks, The Neuromorphic Engineer, Jul. 1, 2009, pp. 1-4, doi: 10.2417/1200906.1659.
Cuntz et al., 'One Rule to Grow Them All: A General Theory of Neuronal Branching and Its Paractical Application' PLOS Computational Biology, 6 (8), Published Aug. 5, 2010.
Davison et al., PyNN: a common interface for neuronal network simulators, Frontiers in Neuroinformatics, Jan. 2009, pp. 1-10, vol. 2, Article 11.
Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.
Fidjeland et al., Accelerated Simulation of Spiking Neural Networks Using GPUs [online],2010 [retrieved on Jun. 15, 2013], Retrieved from the Internet: URL:http://ieeexplore.ieee.org/xpls/abs_all.jsp?ammber=5596678&tag=1.
Gewaltig et al., 'NEST (Neural Simulation Tool)', Scholarpedia, 2007, pp. 1-15, 2(4): 1430, doi: 1 0.4249/scholarpedia.1430.
Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.
Goodman et al., Brian: a simulator for spiking neural networks in Python, Frontiers in Neuroinformatics, Nov. 2008, pp. 1-10, vol. 2, Article 5.
Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conf.fninf.2011.08.00098.
Graham, Lyle J., The Surf-Hippo Reference Manual, http://www.neurophys.biomedicale.univparis5. fr/-graham/surf-hippo-files/Surf-Hippo%20Reference%20Manual.pdf, Mar. 2002, pp. 1-128.
Izhikevich, 'Polychronization: Computation with Spikes', Neural Computation, 25, 2006, 18, 245-282.
Izhikevich, 'Simple Model of Spiking Neurons' IEEE Transactions on Neural Networks, vol. 14, No. 6, Nov. 2003, pp. 1569-1572.
Izhikevich et al., 'Relating STDP to BCM', Neural Computation (2003) 15, 1511-1523.
Karbowski et al., 'Multispikes and Synchronization in a Large Neural Network with Temporal Delays', Neural Computation 12, 1573-1606 (2000).
Laurent, 'The Neural Network Query Language (NNQL) Reference' [retrieved on Nov. 12, 2013]. Retrieved from the Internet: <URL 'https://code.google.com/p/nnql/issues/detail?id=1>.
Laurent, 'Issue 1—nnql—Refactor Nucleus into its own file—Neural Network Query Language' [retrieved on Nov. 12, 2013]. Retrieved from the Internet: URL:https://code.google.com/p/nnql/issues/detail?id=1 .
Nichols, A Re configurable Computing Architecture for Implementing Artificial Neural Networks on FPGA, Master's Thesis, The University of Guelph, 2003, pp. 1-235.
Simulink.RTM. model [online], [Retrieved on Dec. 10, 2013] Retrieved from <URL: http://www.mathworks.com/ products/simulink/index.html>.
Sjostrom et al., 'Spike-Timing Dependent Plasticity' Scholarpedia, 5(2):1362 (2010), pp. 1-18.
Szatmary et al., 'Spike-timing Theory of Working Memory' PLoS Computational Biology, vol. 6, Issue 8, Aug. 19, 2010 [retrieved on Dec. 30, 2013]. Retrieved from the Internet: <URL: http://www.ploscompbiol.org/article/info%3Adoi%2F10.1371%2Fjournal.pcbi.10008 79#>.
PCT International Search Report for PCT/US2013/052136 dated Nov. 30, 2013.
Froemke et al., Temporal modulation of spike-timing-dependent plasticity, Frontiers in Synaptic Neuroscience, vol. 2, Article 19, pp. 1-16 [online] Jun. 2010 [retrieved on Dec. 16, 2013]. Retrieved from the internet: <frontiersin.org>.
Seung, H. "Learning in spiking neural networks by reinforcement of stochastic synaptic transmission." Neuron vol. 40 No. 6 (2003): pp. 1063-1073.
Weber, C. et al. 'Robot docking with neural vision and reinforcement.' Knowledge-Based Systems vol. 17 No. 2 (2004): pp. 165-172.
Baras, D. et al. "Reinforcement learning, spike-time-dependent plasticity, and the BCM rule." Neural Computation vol. 19 No. 8 (2007): pp. 2245-2279.
de Queiroz, M. et al. "Reinforcement learning of a simple control task using the spike response model." Neurocomputing vol. 70 No. 1 (2006): pp. 14-20.
Aleksandrov (1968), Stochastic optimization, Engineering Cybernetics, 5, 11-16.
Amari (1998), Why natural gradient?, Acoustics, Speech and Signal Processing, (pp. 1213-1216). Seattle, WA, USA.
Bartlett et al., (2000) "A Biologically Plausible and Locally Optimal Learning Algorithm for Spiking Neurons" Retrieved from http://arp.anu.edu.au/ftp/papers/jon/brains.pdf.gz.
Baxter et al. (2000.). Direct gradient-based reinforcement learning. In Proceedings of the International Symposium on Circuits.
Bohte et al., "A Computational Theory of Spike-Timing Dependent Plasticity: Achieving Robust Neural Responses via Conditional Entropy Minimization" 2004.
Bohte, (2000). SpikeProp: backpropagation for networks of spiking neurons. In Proceedings of ESANN'2000, (pp. 419-424).
Booij (2005, 6). A Gradient Descent Rule for Spiking Neurons Emitting Multiple Spikes. Information Processing Letters n. 6, v.95 , 552-558.
Breiman et al., "Random Forests" 33pgs, Jan. 2001.
Capel, "Random Forests and Ferns" LPAC, Jan. 11, 2012, 40 pgs.
El-Laithy (2011), A reinforcement learning framework for spiking networks with dynamic synapses, Comput Intell Neurosci.
Fletcher (1987), Practical methods of optimization, New York, NY: Wiley-Interscience.
Florian (2005), A reinforcement learning algorithm for spiking neural networks SYNASC '05 Proceedings of the Seventh International Symposium on Symbolic and Numeric Algorithms for Scientific Computing.
Fremaux et al., "Functional Requirements for Reward-Modulated Spike-Timing-Dependent Plasticity", The Journal of Neuroscience, Oct. 6, 2010, 30 (40):13326-13337.
Fu (2005) Stochastic Gradient Estimation, Technical Research Report.
Fu (2008), What You Should Know About Simulation and Derivatives Naval Research Logistics, vol. 55, No. 8 , 723-736.
Fyfe et al., (2007), Reinforcement Learning Reward Functions for Unsupervised Learning, ISNN '07 Proceedings of the 4th international symposium on Neural Networks: Advances in Neural Networks.
Gerstner (2002), Spiking neuron models: single neurons, populations, plasticity, Cambridge, U.K.: Cambridge University Press.
Glynn (1995), Likelihood ratio gradient estimation for regenerative stochastic recursions, Advances in Applied Probability, 27, 4, 1019-1053.
Ho, "Random Decision Forests" Int'l Conf. Document Analysis and Recognition, 1995, 5 pgs.
Izhikevich (2007), Solving the distal reward problem through linkage of STDP and dopamine signaling, Cerebral Cortex, vol. 17, pp. 2443-2452.
Kalal et al. "Online learning of robust object detectors during unstable tracking" published on 3rd On-line Learning for Computer Vision Workshop 2009, Kyoto, Japan, IEEE CS.
Kiefer (1952), Stochastic Estimation of the Maximum of a Regression Function, Annals of Mathematical Statistics 23, #3, 462-466.
Klampfl (2009), Spiking neurons can learn to solve information bottleneck problems and extract independent components, Neural Computation, 21(4), pp. 911-959.
Kleijnen et al., Optimization and sensitivity analysis of computer simulation models by the score function method Invited Review European Journal of Operational Research, Mar. 1995.
Larochelle et al., (2009), Exploring Strategies for Training Deep Neural Networks, J. of Machine Learning Research, v. 10, pp. 1-40.

(56) References Cited

OTHER PUBLICATIONS

Ojala et al., "Performance Evaluation of Texture Measures with Classification Based on Kullback Discrimination of Distributions" 1994 IEEE, pp. 582-585.
Ozuysal et al., "Fast Keypoint Recognition in Ten Lines of Code" CVPR 2007.
Ozuysal et al., "Fast Keypoint Recognition Using Random Ferns" IEEE Transactions on Pattern Analysis and Machine Intelligence, vol. 32, No. 3, Mar. 2010, pp. 448-461.
Pfister (2003), Optimal Hebbian Learning: A Probabilistic Point of View, In ICANN Proceedings. Springer, pp. 92-98.
Pfister (2006), Optimal Spike-Timing Dependent Plasticity for Precise Action Potential Firing in Supervised Learning, Neural computation ISSN 0899-7667, 18 (6).
Reiman et al. (1989). Sensitivity analysis for simulations via likelihood ratios. Oper Res 37, 830-844.
Robbins (1951), A Stochastic Approximation Method, Annals of Mathematical Statistics 22, #3, 400-407.
Rosenstein et al., (2002), Supervised learning combined with an actor-critic architecture, Technical Report 02-41, Department of Computer Science, University of Massachusetts, Amherst.
Kleijnen et al., "Optimization and sensitivity analysis of computer simulation models by the score function method", Invited Review European Journal of Operational Research, Mar. 1995.
Rumelhart et al., (1986), Learning representations by back-propagating errors, Nature 323 (6088), pp. 533-536.
Rumelhart (1986), Learning internal representations by error propagation, Parallel distributed processing, vol. 1 (pp. 318-362), Cambridge, MA: MIT Press.
Sinyavskiy, et al. "Generalized Stochatic Spiking Neuron Model and Extended Spike Response Model in Spatial-Temporal Impulse Pattern Detection Task", Optical Memory and Neural Networks (Information Optics), 2010, vol. 19, No. 4, pp. 300-309, 2010.
Tishby et al., (1999), The information bottleneck method, In Proceedings of the 37th Annual Allerton Conference on Communication, Control and Computing, B Hajek & RS Sreenivas, eds., pp. 368-377, University of Illinois.
Toyoizumi (2007), Optimality Model of Unsupervised Spike-Timing Dependent Plasticity: Synaptic Memory and Weight Distribution, Neural Computation, 19 (3).
Toyoizumi et al., (2005), Generalized Bienenstock-Cooper-Munro rule for spiking neurons that maximizes information transmission, Proc. Natl. Acad. Sci. USA, 102, (pp. 5239-5244).
Vasilaki et al., "Spike-Based Reinforcement Learning in Continuous State and Action Space: When Policy Gradient Methods Fail" PLoS, vol. 5, Issue 12, Dec. 2009.
Vasilaki, et al., "Learning flexible sensori-motor mappings in a complex network" Biol Cybern (2009) 100:147-158.
Weaver (2001), The Optimal Reward Baseline for Gradient-Based Reinforcement Learning, UAI 01 Proceedings of the 17th Conference in Uncertainty in Artificial Intelligence (pp. 538-545). Morgan Kaufman Publishers.
Weber et al., (2009), Goal-Directed Feature Learning, In: Proc, International Joint Conference on Neural Networks, 3319-3326.
Williams (1992), Simple Statistical Gradient-Following Algorithms for Connectionist Reinforcement Learning, Machine Learning 8, 229-256.

Yi (2009), Stochastic search using the natural gradient, ICML '09 Proceedings of the 26th Annual International Conference on Machine Learning. New York, NY, USA.
Floreano et al., "Neuroevolution: from architectures to learning" Evol. Intel. Jan. 2008 1:47-62, [retrieved Dec. 30, 2013] [retrieved online from URL:<http://inforscience.epfl.ch/record/112676/files/FloreanoDuerrMattiussi2008.pdf>.
Khotanzad, "Classification of invariant image representations using a neural network" IEEF. Transactions on Acoustics, Speech, and Signal Processing, vol. 38, No. 6, Jun. 1990, pp. 1028-1038 [online], [retrieved on Dec. 10, 2013]. Retrieved from the Internet <URL: http://www-ee.uta.edu/eeweb/IP/Courses/SPR/Reference/Khotanzad.pdf>.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet <URL: http://citeseerx.ist.psu.edu/viewdoc/download?doi=10.1.1.5.4346&rep=rep1&type=pdf.
Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet <URL: http://www.kip.uni-heidelberg.de/veroeffentlichungen/download.cgi/4620/ps/1774.pdf>.
Sinyavskiy et al. "Reinforcement learning of a spiking neural network in the task of control of an agent in a virtual discrete environment" Rus. J. Nonlin. Dyn., 2011, vol. 7, No. 4 (Mobile Robots), pp. 859-875, chapters 1-8 (Russian Article with English Abstract).
Hagras, Hani et al., "Evolving Spiking Neural Network Controllers for Autonomous Robots", IEEE 2004.
Masakazu et al, "Convolutional Spiking Neural Network Model for Robust Face Detection", 2002 Proceedings of the 9th International Conference on Neural Information Processing (ICONIP'02), vol. 2.
PCT International Search Report for International Application PCT/US2013/060352 dated Jan. 16, 2014, pp. 1-8.
PCT International Search Report and Written Opinion for International Application No. PCT/US2013/044124 dated Sep. 12, 2013, pp. 1-7.
Hagras, Hani et al., "Evolving Spiking Neural Network Controllers for Autonomous Robots", IEEE 2004; pp. 4620-4626.
Masakazu et al, "Convolutional Spiking Neural Network Model for Robust Face Detection", 2002 Proceedings of the 9th International Conference on Neural Information Processing (ICONIP'02), vol. 2; pp. 660-664.
Sjostrom, Jesper et al., 'Spike-Timing Dependent Plasticity,' Scholarpedia, 5 (2):1362 (2010), pp. 1-12.
Schrauwen et al., "Improving SpikeProp: Enhancements to an Error-Backpropagation Rule for Spiking Neural Networks", ProsRISC workshop, 2004, pp. 301-305.
Ponulak, "Analysis of the Resume learning Process for Spiking Neural Networks," International Journal of Applied Mathematics & Computer Science: Jun. 2008, vol. 18, Issue 2, pp. 117-127.
Masquelier et al., "Unsupervised learning of visual features through spike timing dependent plasticity", PLoS Computational Biology 3.2 (2007): e31, pp. 0247-0257.

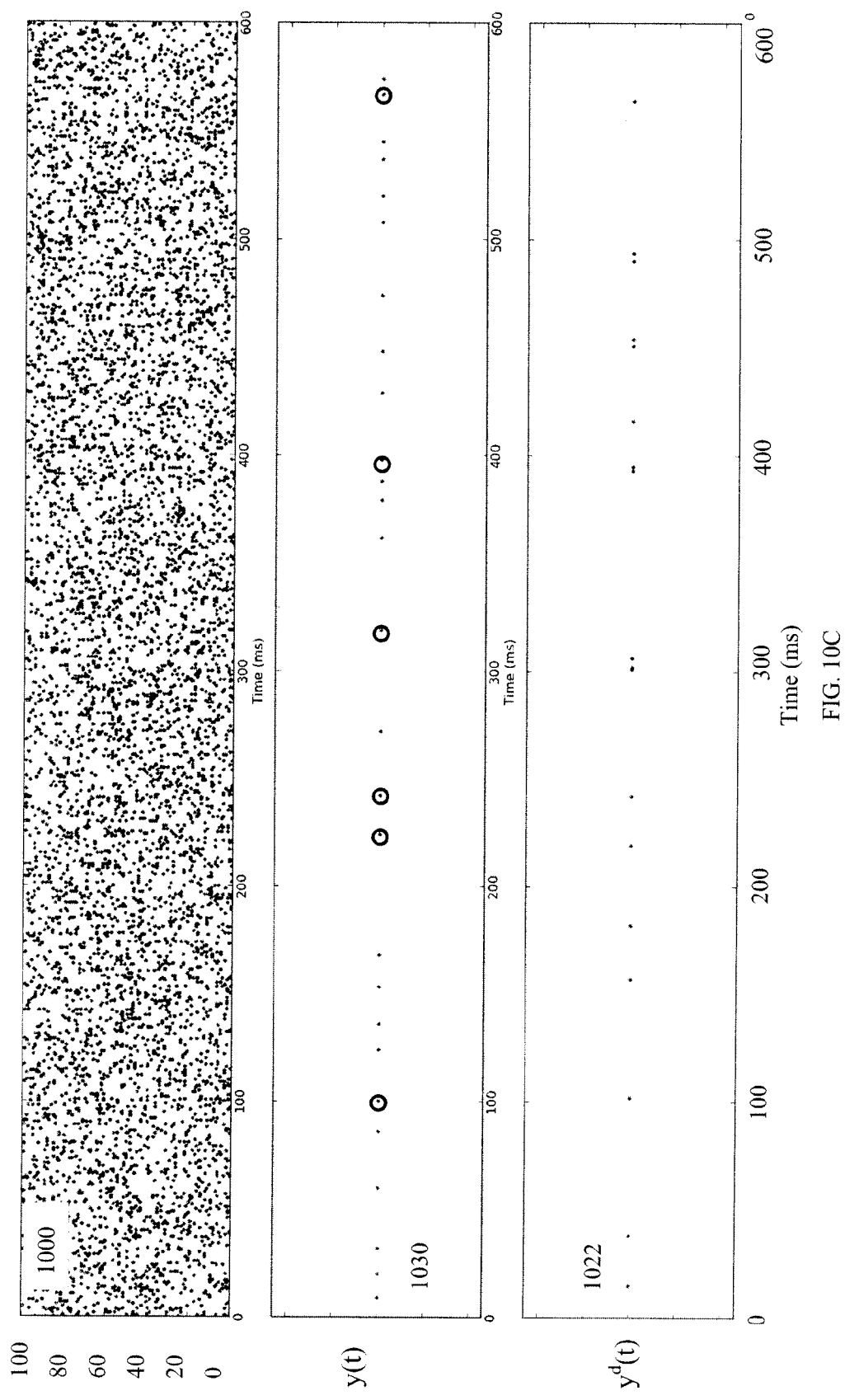

STOCHASTIC APPARATUS AND METHODS FOR IMPLEMENTING GENERALIZED LEARNING RULES

CROSS-REFERENCE TO RELATED APPLICATIONS

This application is related to co-owned, co-pending U.S. patent application Ser. No. 13/487,533 entitled "SYSTEMS AND APPARATUS FOR IMPLEMENTING TASK-SPECIFIC LEARNING USING SPIKING NEURONS", filed contemporaneously herewith, co-owned U.S. patent application Ser. No. 13/487,576 entitled "DYNAMICALLY RECONFIGURABLE STOCHASTIC LEARNING APPARATUS AND METHODS", filed contemporaneously herewith and patented as U.S. Pat. No. 9,015,092 on Apr. 21, 2015, and co-owned U.S. patent application Ser. No. 13/487,621 entitled "LEARNING STOCHASTIC APPARATUS AND METHODS", filed contemporaneously herewith, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present disclosure relates to implementing generalized learning rules in stochastic systems.

2. Description of Related Art

Adaptive signal processing systems are well known in the arts of computerized control and information processing. One typical configuration of an adaptive system is shown in FIG. 1. The system 100 may be capable of changing or "learning" its internal parameters based on the input 102, output 104 signals, and/or an external influence 106. The system 100 may be commonly described using a function 110 that depends (including probabilistic dependence) on the history of inputs and outputs of the system and/or on some external signal r that is related to the inputs and outputs. The function $F(x,y,r)$ may be called a "performance function". The purpose of adaptation (or learning) may be to optimize the input-output transformation according to some criteria, where learning is described as minimization of an average value of the performance function F.

Although there are numerous models of adaptive systems, these typically implement a specific set of learning rules (e.g., supervised, unsupervised, reinforcement). Supervised learning may be the machine learning task of inferring a function from supervised (labeled) training data. Reinforcement learning may refer to an area of machine learning concerned with how an agent ought to take actions in an environment so as to maximize some notion of reward (e.g., immediate or cumulative). Unsupervised learning may refer to the problem of trying to find hidden structure in unlabeled data. Because the examples given to the learner are unlabeled, there is no external signal to evaluate a potential solution.

When the task changes, the learning rules (typically effected by adjusting the control parameters $w=\{w_1, w_2, \ldots, w_n\}$) may need to be modified to suit the new task.

Hereinafter, the boldface variables and symbols with arrow superscripts denote vector quantities, unless specified otherwise. Complex control applications, such as for example, autonomous robot navigation, robotic object manipulation, and/or other applications may require simultaneous implementation of a broad range of learning tasks. Such tasks may include visual recognition of surroundings, motion control, object (face) recognition, object manipulation, and/or other tasks. In order to handle these tasks simultaneously, existing implementations may rely on a partitioning approach, where individual tasks are implemented using separate controllers, each implementing its own learning rule (e.g., supervised, unsupervised, reinforcement).

One typical implementation of multi-task learning controller of prior art is illustrated in FIG. 1A. The apparatus 120 comprises several blocks 120, 124, 130, each implementing a set of learning rules tailored for the particular task (e.g., motor control, visual recognition, object classification and manipulation, respectively). Some of the blocks (e.g., the signal processing block 130 in FIG. 1A) may further comprise sub-blocks (e.g., the blocks 132, 134) targeted at different learning tasks. Implementation of the apparatus 120 may have several shortcomings stemming from each block having a task specific implementation of learning rules. By way of example, a recognition task may be implemented using supervised learning while object manipulator tasks may comprise reinforcement learning. Furthermore, a single task may require use of more than one rule (e.g., signal processing task for block 130 in FIG. 1A) thereby necessitating use of two separate sub-blocks (e.g., blocks 132, 134) each implementing different learning rule (e.g., unsupervised learning and supervised learning, respectively).

Artificial neural networks may be used to solve some of the described problems. An artificial neural network (ANN) may include a mathematical and/or computational model inspired by the structure and/or functional aspects of biological neural networks. A neural network comprises a group of artificial neurons (units) that are interconnected by synaptic connections. Typically, an ANN is an adaptive system that is configured to change its structure (e.g., the connection configuration and/or neuronal states) based on external or internal information that flows through the network during the learning phase.

A spiking neuronal network (SNN) may be a special class of ANN, where neurons communicate by sequences of spikes. SNN may offer improved performance over conventional technologies in areas which include machine vision, pattern detection and pattern recognition, signal filtering, data segmentation, data compression, data mining, system identification and control, optimization and scheduling, and/or complex mapping. Spike generation mechanism may be a discontinuous process (e.g., as illustrated by the pre-synaptic spikes $sx(t)$ 220, 222, 224, 226, 228, and post-synaptic spike train $sy(t)$ 230, 232, 234 in FIG. 2) and a classical derivative of function $F(s(t))$ with respect to spike trains $sx(t)$, $sy(t)$ is not defined.

Even when a neural network is used as the computational engine for these learning tasks, individual tasks may be performed by a separate network partition that implements a task-specific set of learning rules (e.g., adaptive control, classification, recognition, prediction rules, and/or other rules). Unused portions of individual partitions (e.g., motor control when the robotic device is stationary) may remain unavailable to other partitions of the network that may require increased processing resources (e.g., when the stationary robot is performing face recognition tasks). Furthermore, when the learning tasks change during system operation, such partitioning may prevent dynamic retargeting (e.g., of the motor control task to visual recognition task) of the network partitions. Such solutions may lead to expensive and/or over-designed networks, in particular when individual portions are designed using the "worst possible case scenario" approach. Similarly, partitions designed using a limited resource pool configured to handle an average task load may be unable to handle infrequently occurring high computational loads that are beyond a performance capability of the particular partition, even when other portions of the networks have spare capacity.

By way of illustration, consider a mobile robot controlled by a neural network, where the task of the robot is to move in an unknown environment and collect certain resources by the way of trial and error. This can be formulated as reinforcement learning tasks, where the network is supposed to maximize the reward signals (e.g., amount of the collected resource). While in general the environment is unknown, there may be possible situations when the human operator can show to the network desired control signal (e.g., for avoiding obstacles) during the ongoing reinforcement learning. This may be formulated as a supervised learning task. Some existing learning rules for the supervised learning may rely on the gradient of the performance function. The gradient for reinforcement learning part may be implemented through the use of the adaptive critic; the gradient for supervised learning may be implemented by taking a difference between the supervisor signal and the actual output of the controller. Introduction of the critic may be unnecessary for solving reinforcement learning tasks, because direct gradient-based reinforcement learning may be used instead. Analytic derivation of the learning rules may further be required when the loss function between supervised and actual output signal is redefined.

While different types of learning may be formalized as a minimization of the performance function F, often, optimal minimization solution cannot be found analytically, particularly when relationships between system's behavior and the performance function are complex. By way of example, non-linear regression applications generally may not have analytical solutions. Likewise, in motor control applications, it may not be feasible to analytically determine the reward arising from external environment of the robot, as the reward typically may be dependent on the current motor control command and state of the environment. Moreover, analytic determination of a performance function F derivative may require additional operations (often performed manually) for individual new formulated tasks that are not suitable for dynamic switching and reconfiguration of the tasks described before.

Some of the existing approaches of taking a derivative of a performance function without analytic calculations may include a "brute force" finite difference estimator of the gradient. However these estimators may be impractical for use with large spiking networks comprising many (typically in excess of hundreds) parameters.

Derivative-free methods, specifically Score Function (SF), also known as Likelihood Ratio (LR) method, exist. In order to determine a direction of the steepest descent, these methods may sample the value of F(x,y) in different points of parameter space according to some probability distribution. Instead of calculating the derivative of the performance function F(x,y), the SR and LR methods utilize a derivative of the sampling probability distribution. This process can be considered as an exploration of the parameter space.

Although some adaptive controller implementations may describe reward-modulated unsupervised learning algorithms, these implementations of unsupervised learning algorithms may be multiplicatively modulated by reinforcement learning signal and, therefore, may require the presence of reinforcement signal for proper operation.

Many presently available implementations of stochastic adaptive apparatuses may be incapable of learning to perform unsupervised tasks while being influenced by additive reinforcement (and vice versa). Many presently available adaptive implementations may be task-specific and implement one particular learning rule (e.g., classifier unsupervised learning), and such devices invariably require retargeting (e.g., reprogrammed) in order to implement different learning rules. Furthermore, presently available methodologies may not be capable of implementing generalized learning, where a combination of different learning rules (e.g., reinforcement, supervised and supervised) are used simultaneously for the same application (e.g., platform motion stabilization), in order to obtain, for example, faster learning convergence, better response to sudden changes, and/or improved overall stability, particularly in the presence or noise.

Accordingly, there is a salient need for machine learning apparatus and methods to implement generalized stochastic learning configured to handle simultaneously any learning rule combination (e.g., reinforcement, supervised, unsupervised, online, batch) and is capable of, inter alia, dynamic reconfiguration using the same set of network resources.

SUMMARY

The present disclosure satisfies the foregoing needs by providing, inter alia, apparatus and methods for implementing generalized probabilistic learning configured to handle simultaneously various learning rule combinations.

One aspect of the disclosure relates to one or more systems and/or computer-implemented methods for effectuating a stochastic signal processing system configured to implement hybrid learning rules. In one implementation, the system may comprise a controller apparatus configured to generate output control signal y based at least in part on input signal x, the controller apparatus characterized by a controller state parameter S, and a task state parameter w; and a learning apparatus that may be configured to generate an adjustment signal dw based at least in part on the input signal x, the controller state parameter S, and the output signal y; and provide the adjustment signal dw to the controller apparatus, thereby effecting the learning. In some implementations, the task state parameter may be configured in accordance with a signal processing task associated with the input signal x and the output signal y; and the adjustment signal dw may be configured to modify the task state parameter w based at least in part on the input signal x and the output signal y.

In some implementations, the output control signal y may be further based at least in part the adjustment signal dw and the learning apparatus may comprise a task-specific block, configured independent from the controller state parameter, the task-specific block may be configured to implement task-specific learning rule; and a controller-specific block that may be configured independent from the task-specific learning rule; and the task-specific learning rule may comprise a performance function, the performance function configured to effect at least unsupervised learning rule.

In some implementations, the system may further comprise a teaching interface operably coupled to the learning apparatus and configured to provide a teaching signal; the teaching signal may comprise a desired controller output signal; and the performance function may be further configured to effect a supervised learning rule, based at least in part on the desired controller output signal.

In some implementations, the teaching signal may comprise a reinforcement signal associated with current performance of the controller apparatus; and the performance function may be configured to effect a reinforcement learning rule, based at least in part on the reinforcement signal, and the task-specific block may be further configured to effect a hybrid learning rule comprising a combination of the reinforcement, the supervised and the unsupervised learning rules simultaneous with one another.

In some implementations, the task-specific block may be further configured to effect a hybrid learning rule comprising a combination of the reinforcement and the supervised learning rules simultaneous with one another via a linear combination.

In some implementations, the controller-specific block may comprise: gradient determination block configured to determine the gradient; a parameter adaptation block, configured to effect determination of the adjustment signal dw in accordance with a learning mode; and the learning mode comprises any of (i) batch learning and (ii) online learning.

In some implementations, the adjustment signal dw may be determined as a product of controller performance function F with a gradient of per-stimulus entropy parameter h, the gradient may be determined with respect to the controller parameter w; and per-stimulus entropy parameter h may be configured to characterize dependence of the output signal y on (i) the input signal x; and (ii) the task state parameter w.

In some implementations, the per-stimulus entropy parameter may be determined based on a natural logarithm of $p(y|x, w)$, where p denotes conditional probability of signal y given signal x with respect to the state parameter w.

In some implementations, a computerized apparatus may be configured to process input signal x using hybrid learning rule may comprise a stochastic learning block configured to produce learning signal based at least in part on the input signal x and training signal r; wherein the hybrid learning rule may be configured to simultaneously effect reinforcement learning rule and supervised learning rule.

In some implementations, the stochastic learning block may be operable according to a stochastic process characterized by a current state and a desired state, the process being described by at least a state variable configured to transition the learning block from current state to the desired state. In some implementations, the training signal r may comprise a reinforcement indicator associated with current performance of the apparatus, the current performance corresponding to the current state, and desired performance of the apparatus corresponding to the desired state, so that the current performance may be effected, at least partly, by a transition from a prior state to the current state.

In some implementations, the reinforcement learning may be configured based at least in part on the reinforcement indicator so that it may provide positive reinforcement when a distance measure between the current state and the desired state may be smaller compared to the distance measure between the prior state and the desired state; and In some implementations, the training signal r may comprise desired output $y^d$; current performance may be effected, at least partly, by a transition from a prior state to the current state; and the reinforcement learning may be configured based at least in part on the reinforcement indicator so that the reinforcement positive when the current performance may be closer to the desired performance.

In some implementations, the hybrid learning rule may be characterized by a hybrid performance function F comprising a simultaneous combination of reinforcement learning performance function $F_{re}$ and supervised learning performance function $F_{su}$; and the simultaneous combination may be effectuated by at least in part on a value of the hybrid performance function F determined at a time step t, the value comprising reinforcement performance function $F_{re}$ value and supervised learning performance function $F_{su}$ value.

In some implementations, a method of implementing task-dependent hybrid learning may be implemented in a computerized signal processing apparatus. The method may comprise: operating the apparatus in accordance with a stochastic learning process characterized by a deterministic learning parameter, the process configured based at least in part an input signal; configuring learning metric comprising a time-average of a task-specific performance function, the metric configured to characterize response of the process to (i) the input signal; and (ii) a value of the learning parameter; and applying the learning metric to the stochastic learning process, the applying may be configured to reduce time required to achieve desired response by the apparatus to the signal x.

In some implementations, the response y may be characterized by an effective response interval tr; the time average may be determined with respect to a time interval Tav, the time interval Tav being greater that the response interval tr.

In some implementations, ratio of the time interval Tav to the time response interval tr may be selected from the range between 5 and 100.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 10C is a plot presenting simulations data illustrating operation of the neural network of FIG. 7, comprising supervised learning augmented by a substantial amount of unsupervised learning, modeled as 80% fraction of Poisson spikes, in accordance with one or more implementations, where data in the panels from top to bottom comprise: (i) input spike pattern; (ii) output activity of the network after learning, (iii) supervisor spike pattern.

Figure 1:
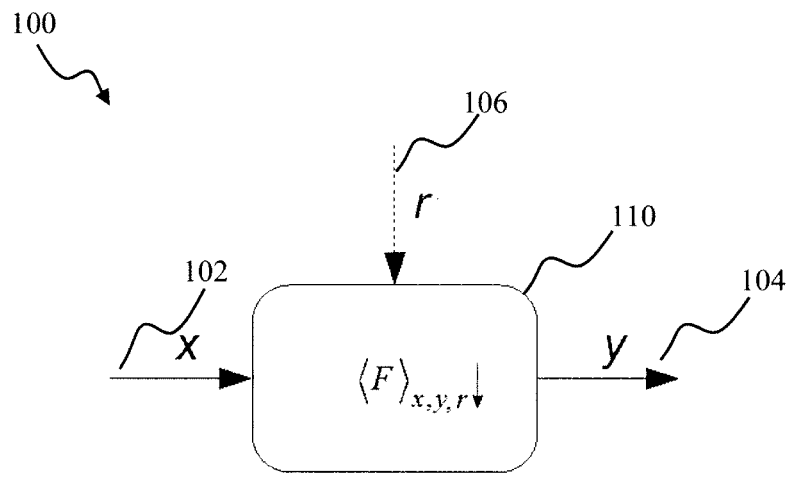
FIG. 1 is a block diagram illustrating a typical architecture of an adaptive system according to prior art.
Figure 1A:
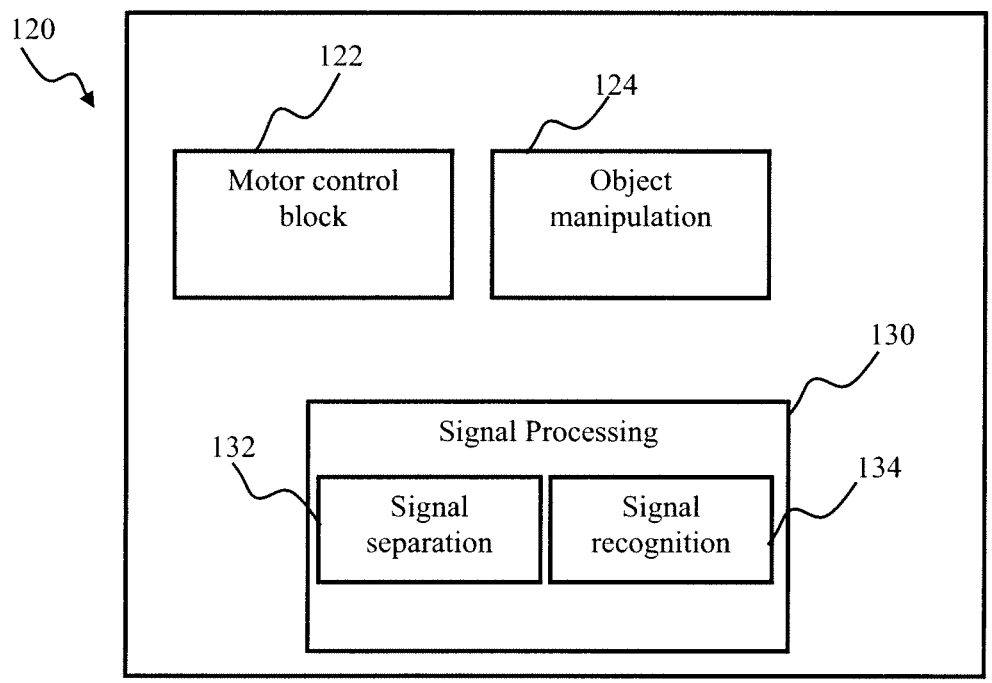
FIG. 1A is a block diagram illustrating multi-task learning controller apparatus according to prior art.
Figure 2:
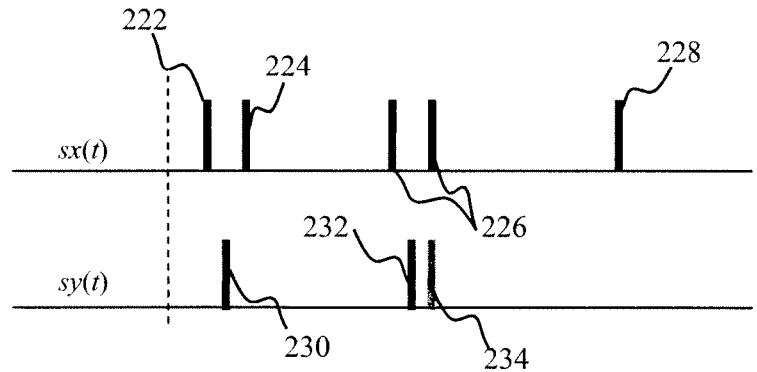
FIG. 2 is a graphical illustration of typical input and output spike trains according to prior art.

All Figures disclosed herein are © Copyright 2012 Brain Corporation. All rights reserved.

DETAILED DESCRIPTION

Exemplary implementations of the present disclosure will now be described in detail with reference to the drawings, which are provided as illustrative examples so as to enable those skilled in the art to practice the disclosure. Notably, the figures and examples below are not meant to limit the scope of the present disclosure to a single implementation, but other implementations are possible by way of interchange of or combination with some or all of the described or illustrated elements. Wherever convenient, the same reference numbers will be used throughout the drawings to refer to same or similar parts.

Where certain elements of these implementations can be partially or fully implemented using known components, only those portions of such known components that are necessary for an understanding of the present disclosure will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example standard "bus", hierarchical bus, network-on-chip, address-event-representation (AER) connection, and/or other type of communication topology used for accessing, e.g., different memories in pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C#, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the terms "state" and "node state" is meant generally to denote a full (or partial) set of dynamic variables used to describe node state.

As used herein, the term "synaptic channel", "connection", "link", "transmission channel", "delay line", and "communications channel" include a link between any two or more entities (whether physical (wired or wireless), or logical/virtual) which enables information exchange between the entities, and may be characterized by a one or more variables affecting the information exchange.

As used herein, the term "Wi-Fi" includes one or more of IEEE-Std. 802.11, variants of IEEE-Std. 802.11, standards related to IEEE-Std. 802.11 (e.g., 802.11a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Overview

The present disclosure provides, among other things, a computerized apparatus and methods for implementing generalized learning rules given multiple cost measures. In one implementation of the disclosure, an adaptive signal processing system may flexibly combine different learning rules (e.g., supervised, unsupervised, reinforcement learning) with different methods (e.g., online or batch learning). The generalized learning apparatus of the disclosure may employ modular architecture where learning tasks are separated from control tasks, so that changes in one of the blocks do not necessitate changes within the other block. By separating implementation of learning tasks from the control tasks, the framework may further allow simultaneous implementation of multiple learning rules concurrently based on the desired control application and without requiring users to explicitly identify the required learning rule composition for that application.

Generalized learning methodology described herein, enables different parts of the same network to implement different adaptive tasks. The end user of the adaptive device is enabled to partition network into different parts, connect these parts appropriately, and assign cost functions to each task (e.g., selecting them from predefined set of rules or implementing a custom rule). The user is not required to understand detailed implementation of the adaptive system (e.g., plasticity rules, neuronal dynamics, etc.) nor is he required to be able to derive the performance function and determine its gradient for each learning task. Instead, the users are able to operate generalized learning apparatus of the disclosure by assigning task functions and connectivity map to each partition.

The framework advantageously enables learning implementation without affecting regular functioning of the adaptive apparatus (i.e., processing of data). Hence, a separate learning stage may not be required and learning can be turned off and on again when appropriate.

Generalized Learning Apparatus

Detailed descriptions of the various implementation of apparatus and methods of the disclosure are now provided. Although certain aspects of the disclosure can best be understood in the context of robotic adaptive control system comprising a spiking neural network, the disclosure is not so limited. Implementations of the disclosure may also be used for implementing a variety of learning systems, such as, for example, signal prediction (e.g., supervised learning), finance applications, data clustering (e.g., unsupervised learning), inventory control, data mining, and/or other applications that do not require performance function derivative computations.

Implementations of the disclosure may be, for example, deployed in a hardware and/or software implementation of a neuromorphic computer system. In some implementations, a robotic system may include a processor embodied in an application specific integrated circuit, which can be adapted or configured for use in an embedded application (e.g., a prosthetic device).

Figure 3:
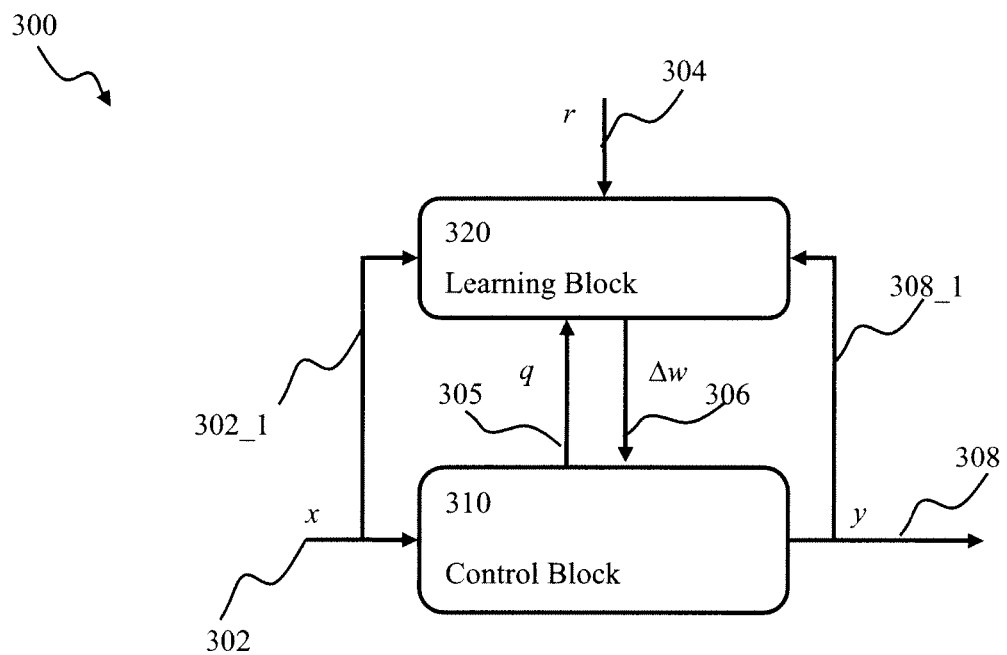
FIG. 3 is a block diagram illustrating generalized learning apparatus, in accordance with one or more implementations.

FIG. 3 illustrates one exemplary learning apparatus useful to the disclosure. The apparatus 300 shown in FIG. 3 comprises the control block 310, which may include a spiking neural network configured to control a robotic arm and may be parameterized by the weights of connections between artificial neurons, and learning block 320, which may implement learning and/or calculating the changes in the connection weights. The control block 310 may receive an input signal x, and may generate an output signal y. The output signal y may include motor control commands configured to move a robotic arm along a desired trajectory. The control block 310 may be characterized by a system model comprising system internal state variables S. An internal state variable q may include a membrane voltage of the neuron, conductance of the membrane, and/or other variables. The control block 310 may be characterized by learning parameters w, which may include synaptic weights of the connections, firing threshold, resting potential of the neuron, and/or other parameters. In one or more implementations, the parameters w may comprise probabilities of signal transmission between the units (e.g., neurons) of the network.

The input signal x(t) may comprise data used for solving a particular control task. In one or more implementations, such as those involving a robotic arm or autonomous robot, the signal x(t) may comprise a stream of raw sensor data (e.g., proximity, inertial, and/or terrain imaging) and/or preprocessed data (e.g., velocity, extracted from accelerometers, distance to obstacle, and/or positions). In some implementations, such as those involving object recognition, the signal x(t) may comprise an array of pixel values (e.g., RGB, CMYK, HSV, HSL, and/or grayscale) in the input image, or preprocessed data (e.g., levels of activations of Gabor filters for face recognition, contours, and/or other preprocessed data). In one or more implementations, the input signal x(t) may comprise desired motion trajectory, for example, in order to predict future state of the robot on the basis of current state and desired motion.

The control block 310 of FIG. 3 may comprise a probabilistic dynamic system, which may be characterized by an analytical input-output (x→y) probabilistic relationship having a conditional probability distribution associated therewith:

$$P = p(y|x, w) \quad \text{(Eqn. 1)}$$

In Eqn. 1, parameter w may denote various system parameters including connection efficacy, firing threshold, resting potential of the neuron, and/or other parameters. The analytical relationship of Eqn. 1 may be selected such that the gradient of ln [p(y|x,w)] with respect to the system parameter w exists and can be calculated. The framework shown in FIG. 3 may be configured to estimate rules for changing the system parameters (e.g., learning rules) so that the performance function $F(x,y,r)$ is minimized for the current set of inputs and outputs and system dynamics S.

In some implementations, the control performance function may be configured to reflect the properties of inputs and outputs (x,y). The values $F(x,y,r)$ may be calculated directly by the learning block 320 without relying on external signal r when providing solution of unsupervised learning tasks.

In some implementations, the value of the function F may be calculated based on a difference between the output y of the control block 310 and a reference signal $y^d$ characterizing the desired control block output. This configuration may provide solutions for supervised learning tasks, as described in detail below.

In some implementations, the value of the performance function F may be determined based on the external signal r. This configuration may provide solutions for reinforcement learning tasks, where r represents reward and punishment signals from the environment.

Learning Block

The learning block 320 may implement learning framework according to the implementation of FIG. 3 that enables generalized learning methods without relying on calculations of the performance function F derivative in order to solve unsupervised, supervised and/or reinforcement learning tasks. The block 320 may receive the input x and output y signals (denoted by the arrow 302_1, 308_1, respectively, in FIG. 3), as well as the state information 305. In some implementations, such as those involving supervised and reinforcement learning, external teaching signal r may be provided to the block 320 as indicated by the arrow 304 in FIG. 3. The teaching signal may comprise, in some implementations, the desired motion trajectory, and/or reward and punishment signals from the external environment.

In one or more implementations the learning block 320 may optimize performance of the control system (e.g., the system 300 of FIG. 3) that is characterized by minimization of the average value of the performance function $F(x,y,r)$ as described in detail below.

Optimization of performance of the control system (e.g., the system 300 of FIG. 3) may, in some implementations, be achieved via maximization of the average of the performance function.

In some implementations, the average value of the performance function may depend on current values of input x, output y, and external signal r as follows:

$$\langle F \rangle_{x,y,r} = \Sigma_{x,y,r} P(x,y,r) F(x,y,r) \to \min \quad \text{(Eqn. 2)}$$

where $P(x,y,r)$ is a joint probability of receiving inputs x, r and generating output y.

The performance function of 2 may be minimized using, for example, gradient descend algorithms. By way of example, derivative of the average value of the function $F_{x,y,r}$ with respect to the system control parameters $w_i$ may be found as:

$$\frac{\partial}{\partial w_i} \langle F(x, y, r) \rangle_{x,y,r} = \left\langle \left\langle F(x, y, r) \frac{\partial}{\partial w_i} \ln(p(y \mid x, w)) \right\rangle_{x,y} \right\rangle_r \quad \text{(Eqn. 3)}$$

where:

$$-\ln(p(y|x,w)) = h(y|x,w) \quad \text{(Eqn. 4)}$$

is the per-stimulus entropy of the system response (or 'surprisal'). The probability of the external signal p(r|x,y) may be characteristic of the external environment and may not change due to adaptation. That property may allow us to omit averaging over external signals r in subsequent consideration of learning rules. In the online version of the algorithm, the changes in the $i^{th}$ parameter $w_i$ may be made after sampling from inputs x and outputs y and receiving the value of F in this point (x,y) using the following equation:

$$\Delta w_i = \gamma F(x, y, r) \frac{\partial h(x \mid y)}{\partial w_i} \quad \text{(Eqn. 5)}$$

where:
γ is a step size of a gradient descent, or a "learning rate"; and $$\frac{\partial (x \mid y)}{\partial w_i}$$

is derivative of the per-stimulus entropy with respect to the learning parameter $w_i$ (also referred to as the score function).

The implementation of Eqn. 5 is configured to minimize the average of the performance function in order to obtain optimal solution. In some implementations, optimization may be effectuated via maximization of the average of the performance function. Hence, the sign of the learning parameter adjustment $\Delta w_i$ of Eqn. 5 is then reversed.

When the value of F also depends on history of the inputs and the outputs, the SF/LR may be extended to stochastic processes using, for example, frameworks developed for episodic Partially Observed Markov Decision Processes (POM-DPs).

When performing reinforcement learning tasks, the adaptive controller 300 of FIG. 3 may be construed as an agent that performs certain actions (e.g., produces an output y) on the basis of sensory state (e.g., inputs x). The agent (i.e., the controller 300) may be provided with the reinforcement signal based on the sensory state and the output. The goal of the controller may be to determine outputs y(t) so as to increase total reinforcement.

Another extension, suitable for online learning, may comprise online algorithm (OLPOMDP) configured to calculate gradient traces that determine an effect of the history of the input on the output of the system for individual parameters as a discounted average of score function values for each time step t, as follows:

$$z_i(t + \Delta t) = \beta z_i(t) + \frac{\partial h(y(t) \mid x(t))}{\partial w_i} \quad \text{(Eqn. 6)}$$

where β is decay coefficient that may be typically based on memory depth required for the control task. In some implementations, control parameters w may be updated each time step according to the value of the performance function F and eligibility traces as follows:

$$\Delta w_i(t) = \gamma F(x,y,r) z_i(t) \quad \text{(Eqn. 7)}$$

where γ is a learning rate and F(t) is a current value of the performance function that may depend on previous inputs and outputs.

As illustrated in FIG. 3, the learning block may have access to the system's inputs and outputs, and/or system internal state S. In some implementations, the learning block may be provided with additional inputs 304 (e.g., reinforcement signals, desired output, and/or current costs of control movements, etc.) that are related to the current task of the control block.

The learning block may estimate changes of the system parameters w that minimize the performance function F, and may provide the parameter adjustment information Δw to the control block 310, as indicated by the arrow 306 in FIG. 3. In some implementations, the learning block may be configured to modify the learning parameters w of the controller block. In one or more implementations (not shown), the learning block may be configured to communicate parameters w (as depicted by the arrow 306 in FIG. 3) for further use by the controller block 310, or to another entity (not shown).

By separating learning related tasks into a separate block (e.g., the block 320 in FIG. 3) from control tasks, the architecture shown in FIG. 3 may provide flexibility of applying different (or modifying) learning algorithms without requiring modifications in the control block model. In other words, the methodology illustrated in FIG. 3 may enable implementation of the learning process in such a way that regular functionality of the control aspects of the system 300 is not affected. For example, learning can be turned off and on again as required with the control block functionality being unaffected.

Figure 4:
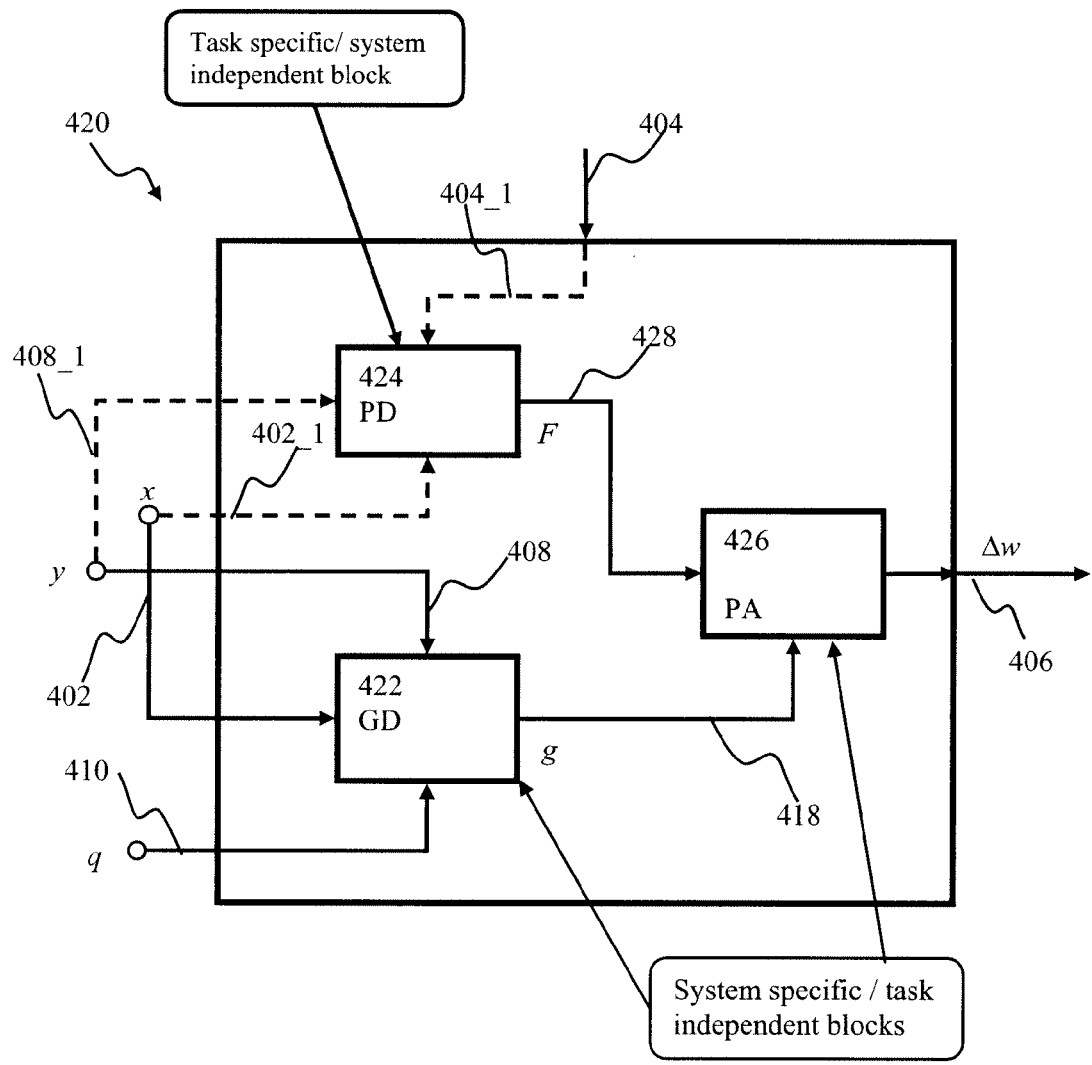
FIG. 4 is a block diagram illustrating learning block apparatus of FIG. 3, in accordance with one or more implementations.

The detailed structure of the learning block 420 is shown and described with respect to FIG. 4. The learning block 420 may comprise one or more of gradient determination (GD) block 422, performance determination (PD) block 424 and parameter adaptation block (PA) 426, and/or other components. The implementation shown in FIG. 4 may decompose the learning process of the block 420 into two parts. A task-dependent/system independent part (i.e., the block 420) may implement a performance determination aspect of learning that is dependent only on the specified learning task (e.g., supervised). Implementation of the PD block 424 may not depend on particulars of the control block (e.g., block 310 in FIG. 3) such as, for example, neural network composition, neuron operating dynamics, and/or other particulars). The second part of the learning block 420, comprised of the blocks 422 and 426 in FIG. 4, may implement task-independent/system dependent aspects of the learning block operation. The implementation of the GD block 422 and PA block 426 may be the same for individual learning rules (e.g., supervised and/or unsupervised). The GD block implementation may further comprise particulars of gradient determination and parameter adaptation that are specific to the controller system 310 architecture (e.g., neural network composition, neuron operating dynamics, and/or plasticity rules). The architecture shown in FIG. 4 may allow users to modify task-specific and/or system-specific portions independently from one another, thereby enabling flexible control of the system performance. An advantage of the framework may be that the learning can be implemented in a way that does not affect the normal protocol of the functioning of the system (except of changing the parameters w). For example, there may be no need in a separate learning stage and learning may be turned off and on again when appropriate.

Gradient Determination Block

The GD block may be configured to determine the score function g by, inter alia, computing derivatives of the logarithm of the conditional probability with respect to the parameters that are subjected to change during learning based on the current inputs x, outputs y, and/or state variables S, denoted by the arrows 402, 408, and 410, respectively, in FIG. 4. The GD block may produce an estimate of the score function g, denoted by the arrow 418 in FIG. 4 that is independent of the particular learning task (e.g., reinforcement, and/or unsupervised or supervised learning). In some implementations, such as where the learning model comprises multiple parameters $w_i$, the score function g may be represented as a vector g comprising scores $g_i$ associated with individual parameter components $w_i$.

Performance Determination Block

The PD block may be configured to determine the performance function F based on the current inputs x, outputs y, and/or training signal r, denoted by the arrow 404 in FIG. 4. In some implementations, the external signal r may comprise the reinforcement signal in the reinforcement learning task. In some implementations, the external signal r may comprise reference signal in the supervised learning task. In other implementations, the external signal r comprises the desired output, current costs of control movements, and/or other information related to the current task of the control block (e.g., block 310 in FIG. 3). Depending on the specific learning task (e.g., reinforcement, unsupervised, or supervised) some of the parameters x,y,r may not be required by the PD block illustrated by the dashed arrows 402_1, 408_1, 404_1, respectively, in FIG. 4A The learning apparatus configuration depicted in FIG. 4 may decouple the PD block from the controller state model so that the output of the PD block depends on the learning task and is independent of the current internal state of the control block.

In some implementations, the PD block may transmit the external signal r to the learning block (as illustrated by the arrow 404_1) so that:

$$F(t)=r(t),\qquad\text{(Eqn. 8)}$$

where signal r provides reward and/or punishment signals from the external environment. By way of illustration, a mobile robot, controlled by spiking neural network, may be configured to collect resources (e.g., clean up trash) while avoiding obstacles (e.g., furniture, walls). In this example, the signal r may comprise a positive indication (e.g., representing a reward) at the moment when the robot acquires the resource (e.g., picks up a piece of rubbish) and a negative indication (e.g., representing a punishment) when the robot collides with an obstacle (e.g., wall). Upon receiving the reinforcement signal r, the spiking neural network of the robot controller may change its parameters (e.g., neuron connection weights) in order to maximize the function F (e.g., maximize the reward and minimize the punishment).

In some implementations, the PD block may determine the performance function by comparing current system output with the desired output using a predetermined measure (e.g., a distance d):

$$F(t)=d(y(t),y^d(t)),\qquad\text{(Eqn. 9)}$$

where y is the output of the control block (e.g., the block 310 in FIG. 3) and $r=y^d$ is the external reference signal indicating the desired output that is expected from the control block. In some implementations, the external reference signal r may depend on the input x into the control block. In some implementations, the control apparatus (e.g., the apparatus 300 of FIG. 3) may comprise a spiking neural network configured for pattern classification. A human expert may present to the network an exemplary sensory pattern x and the desired output $y^d$ that describes the input pattern x class. The network may change (e.g., adapts) its parameters $w_i$ in order to achieve the desired response on the presented pairs of input x and desired response $y^d$. After learning, the network may classify new input stimuli based on one or more past experiences.

In some implementations, such as when characterizing a control block utilizing analog output signals, the distance function may be determined using the squared error estimate as follows:

$$F(t)=(y(t)-y^d(t))^2.\qquad\text{(Eqn. 10)}$$

In some implementations, such as those applicable to control blocks using spiking output signals, the distance measure may be determined using the squared error of the convolved signals y, $y^d$ as follows:

$$F=[(y*\alpha)-(y^d*\beta)]^2,\qquad\text{(Eqn. 11)}$$

where $\alpha$, $\beta$ are finite impulse response kernels. In some implementations, the distance measure may utilize the mutual information between the output signal and the reference signal.

In some implementations, the PD may determine the performance function by comparing one or more particular characteristic of the output signal with the desired value of this characteristic:

$$F=[f(y)-f^d(y)]^2,\qquad\text{(Eqn. 12)}$$

where $f$ is a function configured to extract the characteristic (or characteristics) of interest from the output signal y. By way of example, useful with spiking output signals, the characteristic may correspond to a firing rate of spikes and the function $f(y)$ may determine the mean firing from the output. In some implementations, the desired characteristic value may be provided through the external signal as $$r=f^d(y).\qquad\text{(Eqn. 13)}$$

In some implementations, the $f^d(y)$ may be calculated internally by the PD block.

In some implementations, the PD block may determine the performance function by calculating the instantaneous mutual information i between inputs and outputs of the control block as follows:

$$F=i(x,y)=-\ln(p(y))+\ln(p(y|x)),\qquad\text{(Eqn. 14)}$$

where p(y) is an unconditioned probability of the current output. It is noteworthy that the average value of the instantaneous mutual information may equal the mutual information I(x,y). This performance function may be used when implementing ICA (unsupervised learning).

In some implementations, the PD block may determines the performance function by calculating the unconditional instantaneous entropy h of the output of the control block as follows:

$$F=h(x,y)=-\ln(p(y)).\qquad\text{(Eqn. 15)}$$

where p(y) is an unconditioned probability of the current output. It is noteworthy that the average value of the instantaneous unconditional entropy may equal the unconditional H(x,y). This performance function can be used to reduce variability in the output of the system for adaptive filtering.

In some implementations, the PD block may determine the performance function by calculating the instantaneous Kullback-Leibler divergence $d_{KL}$ between the output probability distribution p(y|x) of the control block and some desired probability distribution q(y|x) as follows:

$$F = d_{KLKL}(x,y) = \ln(p(y|x)) - \ln(q(y|x)). \quad \text{(Eqn. 16)}$$

It is noteworthy that the average value of the instantaneous Kulback-Leibler divergence may equal the $D_{KL}D_{KL}(p,q)$. This performance function can be in unsupervised learning tasks in order to restrict a possible output of the system. For example, if q(y) is a Poisson distribution of spikes with some firing rate R, then minimization of this performance function may force the neuron to have the same firing rate R.

In some implementations, the PD block may determine the performance function for the sparse coding. The sparse coding task may be an unsupervised learning task where the adaptive system may discover hidden components in the data that describes data the best with a constraint that the structure of the hidden components should be sparse:

$$F = \|x - A(y,w)\|^2 + \|y\|^2, \quad \text{(Eqn. 17)}$$

where the first term quantifies how close the data x can be described by the current output y, where A(y,w) is a function that describes how to decode an original data from the output. The second term may calculate a norm of the output and may imply restrictions on the output sparseness.

A learning framework of the present innovation may enable generation of learning rules for a system, which may be configured to solve several completely different tasks-types simultaneously. For example, the system may learn to control an actuator while trying to extract independent components from movement trajectories of this actuator. The combination of tasks may be done as a linear combination of the performance functions for each particular problem:

$$F = C(F_1, F_2, \ldots, F_n), \quad \text{(Eqn. 18)}$$

where:
$F_1, F_2, \ldots, F_n$ are performance function values for different tasks, and
C is a combination function.

In some implementations, the combined cost function C may comprise a weighted linear combination of individual cost functions corresponding to individual learning tasks:

$$C(F_1, F_1, \ldots, F_1) = \Sigma_k a_k F_k, \quad \text{(Eqn. 19)}$$

where $a_k$ are combination weights.

It is recognized by those skilled in the arts that linear cost function combination described by 19 illustrates one particular implementation of the disclosure and other implementations (e.g., a nonlinear combination) may be used as well.

Figure 4A:
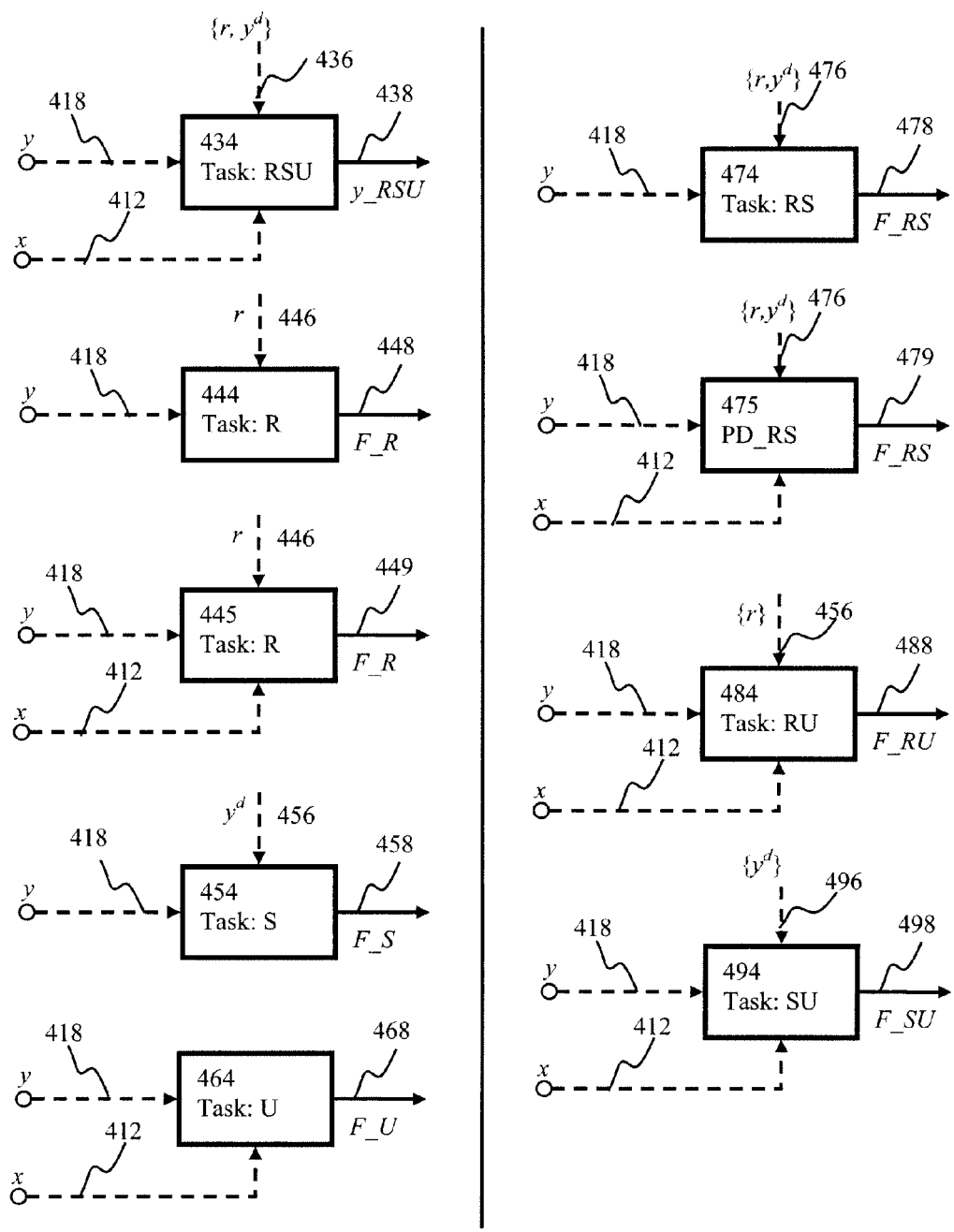
FIG. 4A is a block diagram illustrating exemplary implementations of performance determination block of the learning block apparatus of FIG. 4, in accordance with the disclosure.

Referring now to FIG. 4A different implementations of the performance determination block (e.g., the block 424 of FIG. 4) are shown. The PD block implementation denoted 434, may be configured to simultaneously implement reinforcement, supervised and unsupervised (RSU) learning rules; and/or receive the input signal x(t) 412, the output signal y(t) 418, and/or the learning signal 436. The learning signal 436 may comprise the reinforcement component r(t) and the desired output (teaching) component $y^d(t)$. In one or more implementations, the output performance function F_RSU 438 of the RSUPD block may be determined in accordance with Eqn. 36 described below.

The PD blocks 444, 445, may implement the reinforcement (R) learning rule. The output 448 of the block 444 may be determined based on the output signal y(t) 418 and the reinforcement signal r(t) 446. In one or more implementations, the output 448 of the RSUPD block may be determined in accordance with Eqn. 13. The performance function output 449 of the block 445 may be determined based on the input signal x(t), the output signal y(t), and/or the reinforcement signal r(t).

The PD block implementation denoted 454, may be configured to implement supervised (S) learning rules to generate performance function F_S 458 that is dependent on the output signal y(t) value 418 and the teaching signal $y^d(t)$ 456. In one or more implementations, the output 458 of the PD 454 block may be determined in accordance with Eqn. 9-Eqn. 12.

The output performance function 468 of the PD block 464 implementing unsupervised learning, may be a function of the input x(t) 412 and the output y(t) 418. In one or more implementations, the output 468 may be determined in accordance with Eqn. 14-Eqn. 17.

The PD block implementation denoted 474 may be configured to simultaneously implement reinforcement and supervised (RS) learning rules. The PD block 474 may not require the input signal x(t), and may receive the output signal y(t) 418 and the teaching signals r(t), $y^d(t)$ 476. In one or more implementations, the output performance function F_RS 478 of the PD block 474 may be determined in accordance with Eqn. 18, where the combination coefficient for the unsupervised learning is set to zero. By way of example, in some implementations reinforcement learning task may be to acquire resources by the mobile robot, where the reinforcement component r(t) provides information about acquired resources (reward signal) from the external environment, while at the same time a human expert shows the robot what should be desired output signal $y^d(t)$ to optimally avoid obstacles. By setting a higher coefficient to the supervised part of the performance function, the robot may be trained to try to acquire the resources if it does not contradict with human expert signal for avoiding obstacles.

The PD block implementation denoted 475 may be configured to simultaneously implement reinforcement and supervised (RS) learning rules. The PD block 475 output may be determined based the output signal 418, the learning signals 476, comprising the reinforcement component r(t) and the desired output (teaching) component $y^d(t)$ and on the input signal 412, that determines the context for switching between supervised and reinforcement task functions. By way of example, in some implementations, reinforcement learning task may be used to acquire resources by the mobile robot, where the reinforcement component r(t) provides information about acquired resources (reward signal) from the external environment, while at the same time a human expert shows the robot what should be desired output signal $y^d(t)$ to optimally avoid obstacles. By recognizing obstacles, avoidance context on the basis of some clues in the input signal, the performance signal may be switched between supervised and reinforcement. That may allow the robot to be trained to try to acquire the resources if it does not contradict with human expert signal for avoiding obstacles. In one or more implementations, the output performance function 479 of the PD 475 block may be determined in accordance with Eqn. 18, where the combination coefficient for the unsupervised learning is set to zero.

The PD block implementation denoted 484 may be configured to simultaneously implement reinforcement, and unsupervised (RU) learning rules. The output 488 of the block 484 may be determined based on the input and output signals 412, 418, in one or more implementations, in accordance with Eqn. 18. By way of example, in some implementations of sparse coding (unsupervised learning), the task of the adaptive system on the robot may be not only to extract sparse hidden components from the input signal, but to pay more attention to the components that are behaviorally important for the robot (that provides more reinforcement after they can be used).

The PD block implementation denoted 494, which may be configured to simultaneously implement supervised and unsupervised (SU) learning rules, may receive the input signal x(t) 412, the output signal y(t) 418, and/or the teaching signal $y^d(t)$ 436. In one or more implementations, the output performance function F_SU 438 of the SU PD block may be determined in accordance with Eqn. 35 described below.

By the way of example, the stochastic learning system (that is associated with the PD block implementation 494) may be configured to learn to implement unsupervised data categorization (e.g., using sparse coding performance function), while simultaneously receiving external signal that is related to the correct category of particular input signals. In one or more implementations such reward signal may be provided by a human expert.

Parameter Changing Block

The parameter changing PA block (the block 426 in FIG. 4) may determine changes of the control block parameters $\Delta w_i$ according to a predetermined learning algorithm, based on the performance function F and the gradient g it receives from the PD block 424 and the GD block 422, as indicated by the arrows marked 428, 430, respectively, in FIG. 4. Particular implementation of the learning algorithm within the block 426 may depend on the type of the control signals (e.g., spiking or analog) used by the control block 310 of FIG. 3.

Description below illustrates several exemplary implementations of PA learning algorithms applicable with spiking control signals. In some implementations, the PA learning algorithms may comprise a multiplicative online learning rule, where control parameter changes are determined as follows:

$$\Delta \vec{w}(t) = \gamma F(t) \vec{g}(t), \quad \text{(Eqn. 20)}$$

where γ is the learning rate configured to determine speed of learning adaptation. The learning method implementation according to (Eqn. 20) may be advantageous in applications where the performance function F(t) may depend on the current values of the inputs x, outputs y, and/or signal r.

In some implementations, the control parameter adjustment Δw may be determined using an accumulation of the score function gradient and the performance function values, and applying the changes at a predetermined time instance (corresponding to, e.g., the end of the learning epoch):

$$\Delta_w^r(t) = \frac{\gamma}{N^2} \cdot \sum_{i=0}^{N-1} F(t - i\Delta t) \cdot \sum_{i=0}^{N-1} \vec{g}(t - i\Delta t), \quad \text{(Eqn. 21)}$$

where:
T is a finite interval over which the summation occurs;
N is the number of steps; and
Δt is the time step determined as T/N.

The summation interval T in Eqn. 21 may be configured based on the specific requirements of the control application. By way of illustration, in a control application where a robotic arm is configured to reaching for an object, the interval may correspond to a time from the start position of the arm to the reaching point and, in some implementations, may be about 1 s-50 s. In a speech recognition application, the time interval T may match the time required to pronounce the word being recognized (typically less than 1 s-2 s). In some implementations of spiking neuronal networks, Δt may be configured in range between 1 ms and 20 ms, corresponding to 50 steps (N=50) in one second interval.

The method of Eqn. 21 may be computationally expensive and may not provide timely updates. Hence, it may be referred to as the non-local in time due to the summation over the interval T. However, it may lead to unbiased estimation of the gradient of the performance function.

In some implementations, the control parameter adjustment $\Delta w_i$ may be determined by calculating the traces of the score function $e_i(t)$ for individual parameters $w_i$. In some implementations, the traces may be computed using a convolution with an exponential kernel as follows:

$$\vec{e}(t+\Delta t) = \beta \vec{e}(t) + \vec{g}(t), \quad \text{(Eqn. 22)}$$

where β is the decay coefficient. In some implementations, the traces may be determined using differential equations:

$$\frac{d}{dt} \vec{e}(t) = -\tau \vec{e}(t) + \vec{g}(t). \quad \text{(Eqn. 23)}$$

The control parameter w may then be adjusted as:

$$\Delta \vec{w}(t) = \Delta F(t) \vec{e}(t), \quad \text{(Eqn. 24)}$$

where γ is the learning rate. The method of Eqn. 22-Eqn. 24 may be appropriate when a performance function depends on current and past values of the inputs and outputs and may be referred to as the OLPOMDP algorithm. While it may be local in time and computationally simple, it may lead to biased estimate of the performance function. By way of illustration, the methodology described by Eqn. 22-Eqn. 24 may be used, in some implementations, in a rescue robotic device configured to locate resources (e.g., survivors, or unexploded ordinance) in a building. The input x may correspond to the robot current position in the building. The reward r (e.g., the successful location events) may depend on the history of inputs and on the history of actions taken by the agent (e.g., left/right turns, up/down movement, etc.).

In some implementation, the control parameter adjustment Δw determined using methodologies of the Eqns. 16, 17, 19 may be further modified using, in one variant, gradient with momentum according to:

$$\Delta \vec{w}(t) = \mu \Delta \vec{w}(t-\Delta t) + \Delta \vec{w}(t), \quad \text{(Eqn. 25)}$$

where μ is the momentum coefficient. In some implementations, the sign of gradient may be used to perform learning adjustments as follows:

$$\Delta w_i(t) = \frac{\Delta w_i(t)}{|\Delta w_i(t)|}. \quad \text{(Eqn. 26)}$$

In some implementations, gradient descend methodology may be used for learning coefficient adaptation.

In some implementations, the gradient signal g, determined by the PD block 422 of FIG. 4, may be subsequently modified according to another gradient algorithm, as described in detail below. In some implementations, these modifications may comprise determining natural gradient, as follows:

$$\Delta \vec{w} = \left\langle \vec{g} \cdot \vec{g}^T \right\rangle_{x,y}^{-1} \cdot \left\langle \vec{g} \cdot F \right\rangle_{x,y}, \quad \text{(Eqn. 27)}$$

where $\left\langle \vec{g} \vec{g} \right\rangle_{x,y}, \left\langle \vec{g} \vec{g}^T \right\rangle_{x,y}$ is the Fisher information metric matrix. Applying the following transformation to Eqn. 21:

$$\left\langle \vec{g}(\vec{g}^T \Delta \vec{w} - F) \right\rangle_{x,y} = 0, \quad \text{(Eqn. 28)}$$

natural gradient from linear regression task may be obtained as follows:

$$G \Delta \vec{w} = \vec{F} \quad \text{(Eqn. 29)}$$

where $G = [\vec{g_0}^T, \ldots, \vec{g_n}^T]$—a matrix comprising n samples of the score function g, $\vec{F}^T = [F_0, \ldots, F_n]$ is the a vector of performance function samples, and n is a number of samples that should be equal or greater of the number of the parameters $w_i$. While the methodology of Eqn. 27-Eqn. 29 may be computationally expensive, it may help dealing with "plateau"-like landscapes of the performance function.

Signal Processing Apparatus

In one or more implementations, the generalized learning framework described supra, may enable implementing signal processing blocks with tunable parameters w. Using the learning block framework that provides analytical description of individual types of signal processing block may enable it to automatically calculate the appropriate score function $$\frac{\partial h(x \mid y)}{\partial w_i}$$

for individual parameters of the block. Using the learning architecture described in FIG. 3, a generalized implementation of the learning block may enable automatic changes of learning parameters w by individual blocks based on high level information about the subtask for each block. A signal processing system comprising one or more of such generalized learning blocks may be capable of solving different learning tasks useful in a variety of applications without substantial intervention of the user. In some implementations, such generalized learning blocks may be configured to implement generalized learning framework described above with respect to FIGS. 3-4A and delivered to users. In developing complex signal processing systems, the user may connect different blocks, and/or specify a performance function and/or a learning algorithm for individual blocks. This may be done, for example, with the special graphical user interface (GUI), which may allow blocks to be connected using a mouse or other input peripheral by clicking on individual blocks and using defaults or choosing the performance function and a learning algorithm from a predefined list. Users may not need to re-create learning adaptation framework and may rely on the adaptive properties of the generalized learning blocks that adapt to the particular learning task. When the user desires to add a new type of block into the system, he may need to describe it in a way suitable to automatically calculate score functions for individual parameters.

Figure 5:
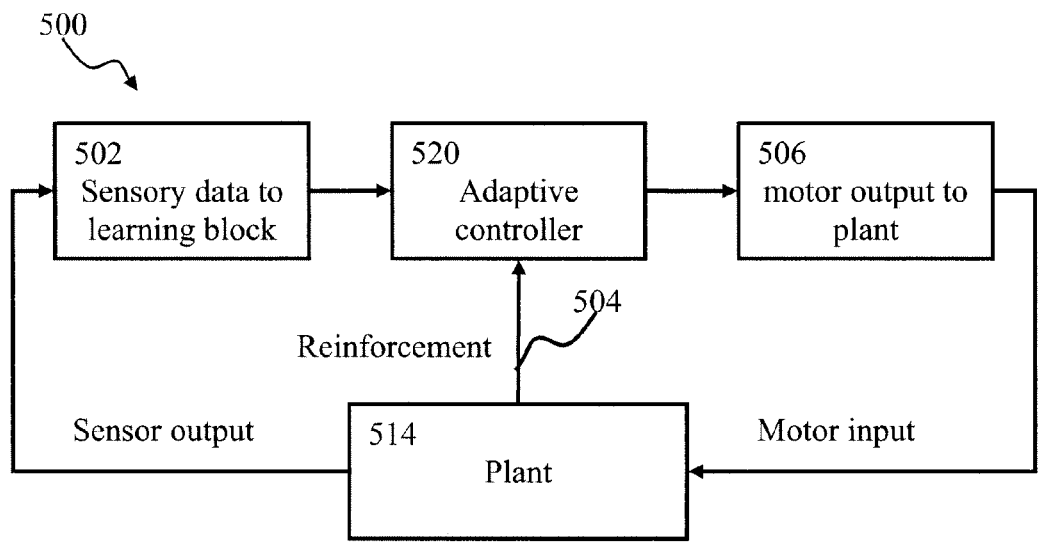
FIG. 5 is a block diagram illustrating generalized learning apparatus, in accordance with one or more implementations.

Referring now to FIG. 5, which illustrates one exemplary implementation of a robotic apparatus 500 comprising adaptive controller apparatus 512. In some implementations, the adaptive controller 520 may be configured similar to the apparatus 300 of FIG. 3 and may comprise generalized learning block (e.g., the block 420), configured, for example according to the framework described above with respect to FIG. 4, supra, is shown and described. The robotic apparatus 500 may comprise the plant 514, corresponding, for example, to a sensor block and a motor block (not shown). The plant 514 may provide sensory input 502, which may include a stream of raw sensor data (e.g., proximity, inertial, and/or terrain imaging) and/or preprocessed data (e.g., velocity, extracted from accelerometers, distance to obstacle, and/or positions) to the controller apparatus 520. The learning block of the controller 520 may be configured to implement reinforcement learning, according to, in some implementations Eqn. 13, based on the sensor input 502 and reinforcement signal 504 (e.g., obstacle collision signal from robot bumpers, distance from robotic arm endpoint to the desired position), and may provide motor commands 506 to the plant. The learning block of the adaptive controller apparatus (e.g., the apparatus 520 of FIG. 5) may perform learning parameter (e.g., weight) adaptation using reinforcement learning approach without having any prior information about the model of the controlled plant (e.g., the plant 514 of FIG. 5). The reinforcement signal r(t) may inform the adaptive controller that the previous behavior led to "desired" or "undesired" results, corresponding to positive and negative reinforcements, respectively. While the plant 514 must be controllable (e.g., via the motor commands in FIG. 5) and the control system may be required to have access to appropriate sensory information (e.g., the data 502 in FIG. 5), detailed knowledge of motor actuator dynamics or of structure and significance of sensory signals may not be required to be known by the controller apparatus 520.

Figure 5A:
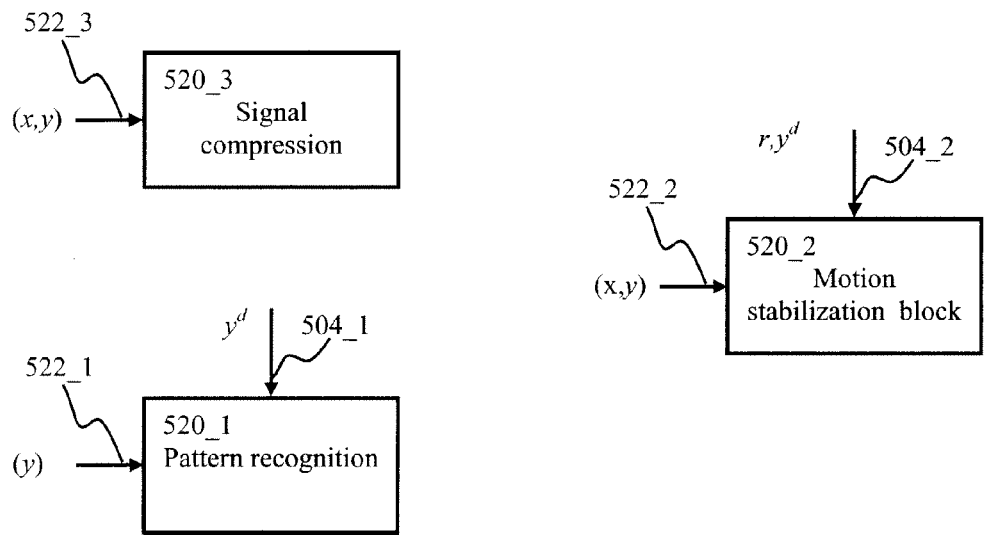
FIG. 5A is a block diagram illustrating generalized learning block configured for implementing different learning rules, in accordance with one or more implementations.

It will be appreciated by those skilled in the arts that the reinforcement learning configuration of the generalized learning controller apparatus 520 of FIG. 5 is used to illustrate one exemplary implementation of the disclosure and myriad of other configurations may be used with the generalized learning framework described herein. By way of example, the adaptive controller 520 of FIG. 5 may be configured for: (i) unsupervised learning for performing target recognition, as illustrated by the adaptive controller 5203 of FIG. 5A, receiving sensory input and output signals (x,y) 522_3; (ii) supervised learning for performing data regression, as illustrated by the adaptive controller 520_3 receiving output signal 522_1 and teaching signal 504_1 of FIG. 5A; and/or (iii) simultaneous supervised and unsupervised learning for performing platform stabilization, as illustrated by the adaptive controller 520_2 of FIG. 5A, receiving input 522_2 and learning 504_2 signals.

Figure 5B:
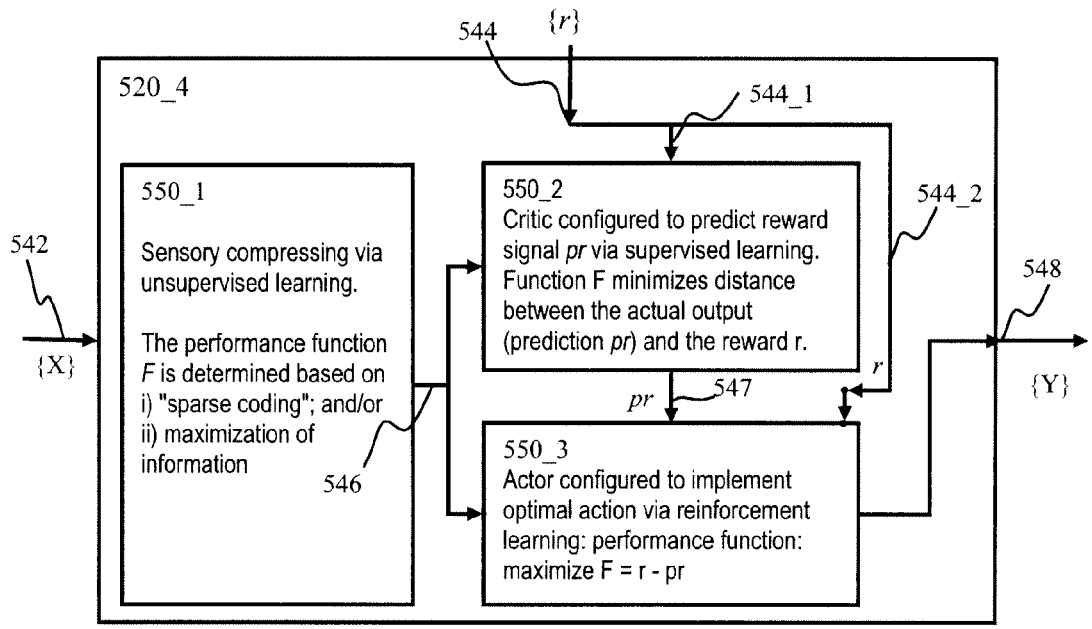
FIG. 5B is a block diagram illustrating generalized learning block configured for implementing different learning rules, in accordance with one or more implementations.
Figure 5C:
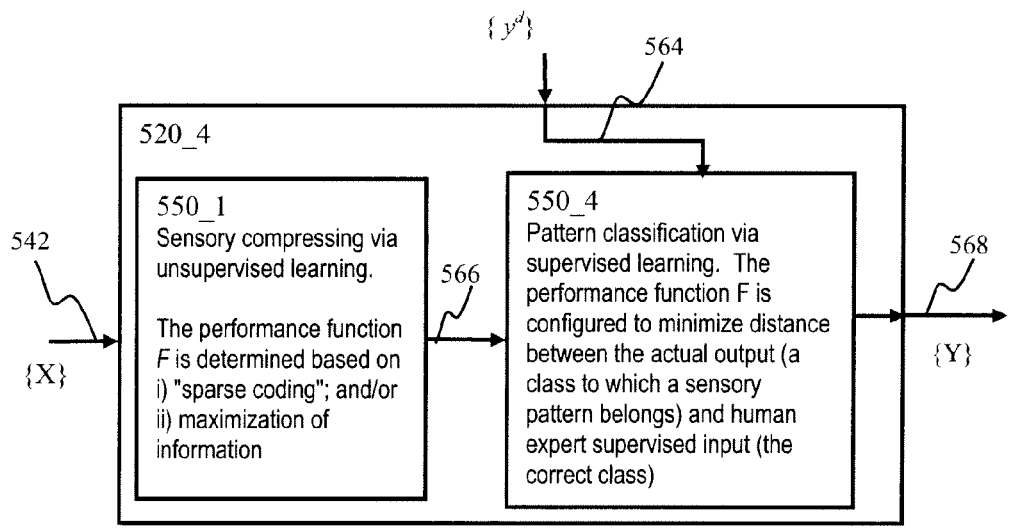
FIG. 5C is a logical block diagram of a learning controller configured to implement a plurality of tasks, in accordance with one or more implementations.

FIGS. 5B-5C illustrate dynamic tasking by a user of the adaptive controller apparatus (e.g., the apparatus 320 of FIG. 3A or 520 of FIG. 5, described supra) in accordance with one or more implementations.

A user of the adaptive controller 520_4 of FIG. 5B may utilize a user interface (textual, graphics, touch screen, etc.) in order to configure the task composition of the adaptive controller 520_4, as illustrated by the example of FIG. 5B. By way of illustration, at one instance for one application the adaptive controller 520_4 of FIG. 5B may be configured to perform the following tasks: (i) task 550_1 comprising sensory compressing via unsupervised learning; (ii) task 550_2 comprising reward signal prediction by a critic block in supervised learning applications; and (ii) task 550_3 comprising implementation of optimal action by an actor block via reinforcement learning. In addition, the user may specify that task 550_1 may receive external input {X} 542, comprising, for example raw audio or video stream, output 546 of the task 550_1 may be routed to each of tasks 550_2, 550_3; output 547 of the task 550_2 may be routed to the task 550_3; and the external signal {r} (544) may be provided to each of tasks 550_2, 550_3, via pathways 544_1, 544_2, respectively as illustrated in FIG. 5B. In the implementation illustrated in FIG. 5B, the external signal {r} may be configured as {r}={$y^d$(t), r(t)}, the pathway 544_1 may carry the desired output $y^d$(t), while the pathway 544_2 may carry the reinforcement signal r(t).

Once the user specifies the learning type(s) associated with each task (unsupervised, supervised and reinforcement, respectively) the controller 520_4 of FIG. 5B may automatically configure the respective performance functions, without further user intervention. By way of illustration, performance function $F_u$ of the task 550_1 may be determined based on (i) 'sparse coding'; and/or (ii) maximization of information. Performance function $F_s$ of the task 550_2 may be determined based on minimizing distance between the actual output 547 (prediction pr) d(r, pr) and the external reward signal r 544_1. Performance function $F_r$ of the task 5503 may be determined based on maximizing the difference F=r−pr. In some implementations, the end user may select performance functions from a predefined set, while in some implementations the user may implement a custom task.

At another instance in a different application, illustrated in FIG. 5C, the controller 520_4 may be configured to perform a different set of task: (i) the task 550_1, described above with respect to FIG. 5B; and task 552_4, comprising pattern classification via supervised learning. As shown in FIG. 5C, the output of task 550_1 may be provided as the input 566 to the task 550_4.

Similarly to the implementation of FIG. 5B, once the user specifies the learning type(s) associated with each task (unsupervised and supervised, respectively) the controller 520_4 of FIG. 5C may automatically configure the respective performance functions, without further user intervention. By way of illustration, the performance function corresponding to the task 550_4 may be configured to minimize distance between the actual task output 568 (e.g., a class {Y} to which a sensory pattern belongs) and human expert supervised signal 564 (the correct class $y^d$).

Generalized learning methodology described herein may enable the learning apparatus 520_4 to implement different adaptive tasks, by, for example, executing different instances of the generalized learning method, individual ones configured in accordance with the particular task (e.g., tasks 550_1, 550_2, 550_3, in FIG. 5B, and 550_4, 550_5 in FIG. 5C). The user of the apparatus may not be required to know implementation details of the adaptive controller (e.g., specific performance function selection, and/or gradient determination). Instead, the user may 'task' the system in terms of task functions and connectivity.

Partitioned Network Apparatus

Figures 6A, 6B:
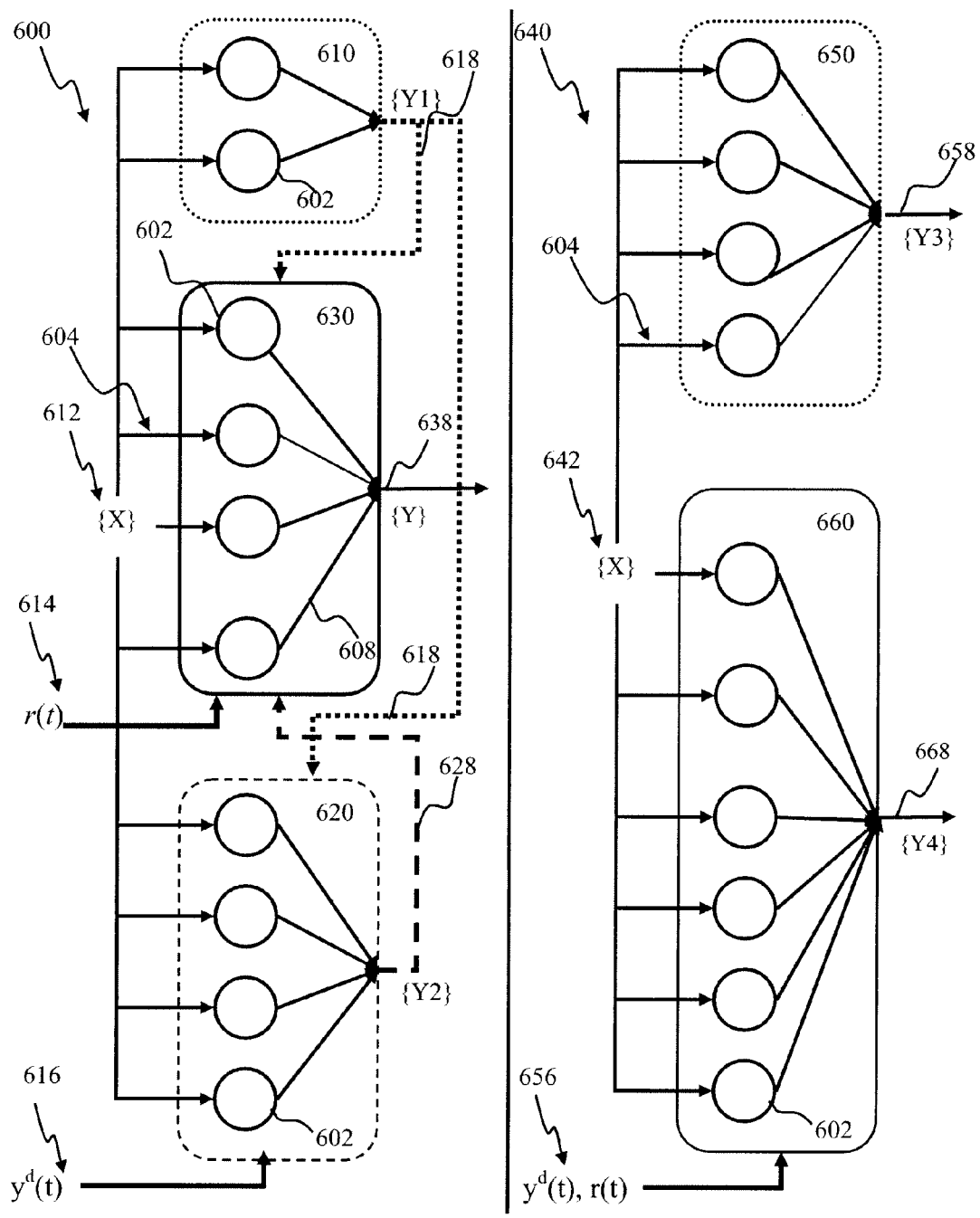
FIG. 6A is a block diagram illustrating a spiking neural network, comprising three dynamically configured partitions, configured to effectuate generalized learning block of FIG. 4, in accordance with one or more implementations.
FIG. 6B is a block diagram illustrating a spiking neural network, comprising two dynamically configured partitions, adapted to effectuate generalized learning, in accordance with one or more implementations.

FIGS. 6A-6B illustrate exemplary implementations of reconfigurable partitioned neural network apparatus comprising generalized learning framework, described above. The network 600 of FIG. 6A may comprise several partitions 610, 620, 630, comprising one or more of nodes 602 receiving inputs 612 {X} via connections 604, and providing outputs via connections 608.

In one or more implementations, the nodes 602 of the network 600 may comprise spiking neurons (e.g., the neurons 730 of FIG. 9, described below), the connections 604, 608 may be configured to carry spiking input into neurons, and spiking output from the neurons, respectively. The neurons 602 may be configured to generate post-synaptic spikes (as described in, for example, co-owned U.S. patent application Ser. No. 13/152,105 filed on Jun. 2, 2011, and entitled "APPARATUS AND METHODS FOR TEMPORALLY PROXIMATE OBJECT RECOGNITION", incorporated by reference herein in its entirety) which may be propagated via feed-forward connections 608.

In some implementations, the network 600 may comprise artificial neurons, such as for example, spiking neurons described by co-owned U.S. patent application Ser. No. 13/152,105 filed on Jun. 2, 2011, and entitled "APPARATUS AND METHODS FOR TEMPORALLY PROXIMATE OBJECT RECOGNITION", incorporated supra, artificial neurons with sigmoidal activation function, binary neurons (perceptron), radial basis function units, and/or fuzzy logic networks.

Different partitions of the network 600 may be configured, in some implementations, to perform specialized functionality. By way of example, the partition 610 may adapt raw sensory input of a robotic apparatus to internal format of the network (e.g., convert analog signal representation to spiking) using for example, methodology described in U.S. patent application Ser. No. 13/314,066, filed Dec. 7, 2011, entitled "NEURAL NETWORK APPARATUS AND METHODS FOR SIGNAL CONVERSION", incorporated herein by reference in its entirety. The output {Y1} of the partition 610 may be forwarded to other partitions, for example, partitions 620, 630, as illustrated by the broken line arrows 618, 618_1 in FIG. 6A. The partition 620 may implement visual object recognition learning that may require training input signal $y^d_j$(t) 616, such as for example an object template and/or a class designation (friend/foe). The output {Y2}) of the partition 620 may be forwarded to another partition (e.g., partition 630) as illustrated by the dashed line arrow 628 in FIG. 6A. The partition 630 may implement motor control commands required for the robotic arm to reach and grasp the identified object, or motor commands configured to move robot or camera to a new location, which may require reinforcement signal r(t) 614. The partition 630 may generate the output {Y} 638 of the network 600 implementing adaptive controller apparatus (e.g., the apparatus 520 of FIG. 5). The homogeneous configuration of the network 600, illustrated in FIG. 6A, may enable a single network comprising several generalized nodes of the same type to implement different learning tasks (e.g., reinforcement and supervised) simultaneously.

In one or more implementations, the input 612 may comprise input from one or more sensor sources (e.g., optical input {Xopt} and audio input {Xaud}) with each modality data being routed to the appropriate network partition, for example, to partitions 610, 630 of FIG. 6A, respectively.

The homogeneous nature of the network 600 may enable dynamic reconfiguration of the network during its operation. FIG. 6B illustrates one exemplary implementation of network reconfiguration in accordance with the disclosure. The network 640 may comprise partition 650, which may be configured to perform unsupervised learning task, and partition 660, which may be configured to implement supervised and reinforcement learning simultaneously. The network configuration of FIG. 6B may be used to perform signal separation tasks by the partition 650 and signal classification tasks by the partition 660. The partition 650 may be operated according to unsupervised learning rule and may generate output {Y3} denoted by the arrow 658 in FIG. 6B. The partition 660 may be operated according to a combined reinforcement and supervised rule, may receive supervised and reinforcement input 656, and/or may generate the output {Y4} 668.

The dynamic network learning reconfiguration illustrated in FIGS. 6A-6B may be used, for example, in an autonomous robotic apparatus performing exploration tasks (e.g., a pipeline inspection autonomous underwater vehicle (AUV), or space rover, explosive detection, and/or mine exploration). When certain functionality of the robot is not required (e.g., the arm manipulation function) the available network resources (i.e., the nodes 602) may be reassigned to perform different tasks. Such reuse of network resources may be traded for (i) smaller network processing apparatus, having lower cost, size and consuming less power, as compared to a fixed pre-determined configuration; and/or (ii) increased processing capability for the same network capacity.

As is appreciated by those skilled in the arts, the reconfiguration methodology described supra may comprise a static reconfiguration, where particular node populations are designated in advance for specific partitions (tasks); a dynamic reconfiguration, where node partitions are determined adaptively based on the input information received by the network and network state; and/or a semi-static reconfiguration, where static partitions are assigned predetermined life-span.

Spiking Network Apparatus

Figure 7:
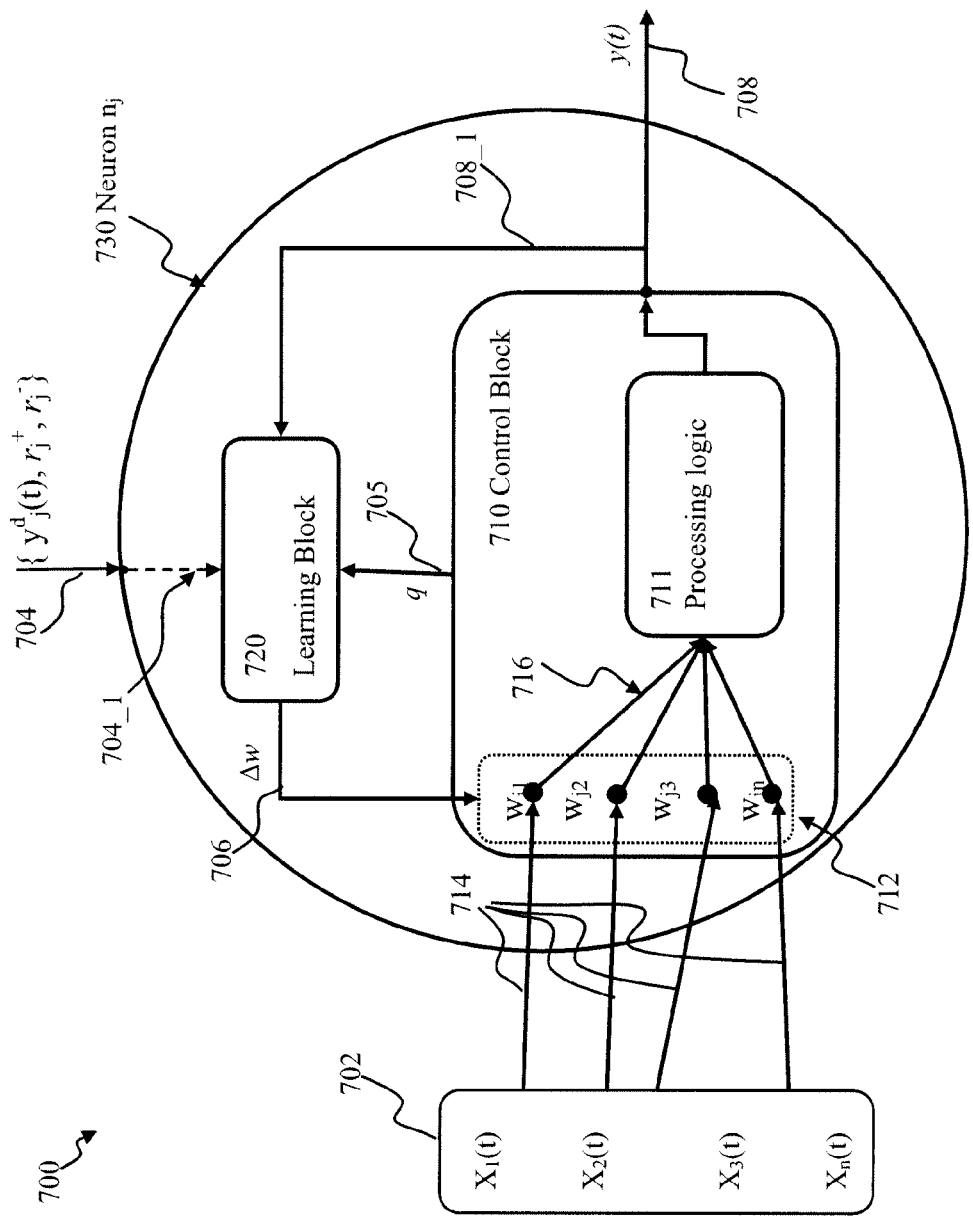
FIG. 7 is a block diagram illustrating spiking neural network configured to effectuate multiple learning rules, in accordance with one or more implementations.

Referring now to FIG. 7, one implementation of spiking network apparatus for effectuating the generalized learning framework of the disclosure is shown and described in detail. The network 700 may comprise at least one stochastic spiking neuron 730, operable according to, for example, a Spike Response Model, sand configured to receive n-dimensional input spiking stream X(t) 702 via n-input connections 714. In some implementations, the n-dimensional spike stream may correspond to n-input synaptic connections into the neuron. As shown in FIG. 7, individual input connections may be characterized by a connection parameter 712 $w_{ij}$ that is configured to be adjusted during learning. In one or more implementation, the connection parameter may comprise connection efficacy (e.g., weight). In some implementations, the parameter 712 may comprise synaptic delay. In some implementations, the parameter 712 may comprise probabilities of synaptic transmission.

The following signal notation may be used in describing operation of the network 700, below:

$$y(t) = \sum_i \delta(t - t_i)$$

denotes the output spike pattern, corresponding to the output signal 708 produced by the control block 710 of FIG. 3, where $t_i$ denotes the times of the output spikes generated by the neuron;

$$y^d(t) = \sum_{t_i} \delta(t - t_i^d)$$

denotes the teaching spike pattern, corresponding to the desired (or reference) signal that is part of external signal 404 of FIG. 4, where $t_i^d$ denotes the times when the spikes of the reference signal are received by the neuron;

$r^+(t)=\Sigma_i\delta(t-t_i^+)$, $r^-(t)=\Sigma_i\delta(t-t_i^-)$ denote the reinforcement signal spike stream, corresponding to signal 304 of FIG. 3, and external signal 404 of FIG. 4, where $t_i^+, t_i^-$ denote the spike times associated with positive and negative reinforcement, respectively.

In some implementations, the neuron 730 may be configured to receive training inputs, comprising the desired output (reference signal) $y^d(t)$ via the connection 704. In some implementations, the neuron 730 may be configured to receive positive and negative reinforcement signals via the connection 704.

The neuron 730 may be configured to implement the control block 710 (that performs functionality of the control block 310 of FIG. 3) and the learning block 720 (that performs functionality of the control block 320 of FIG. 3, described supra.) The block 710 may be configured to receive input spike trains X(t), as indicated by solid arrows 716 in FIG. 7. The input spike trains may be processed using processing logic 711, configured to generate output spike train y(t) 708 according to a Spike Response Model neuron which voltage v(t) is calculated as:

$$v(t) = \sum_{i,k} w_i \cdot \alpha(t - t_i^k),$$

where $w_i w_i$—represents weights of the input channels, $t_i^k$—represents input spike times, $\alpha(t)=(t/\tau_\alpha)e^{1-(t/\tau_\alpha)}$—represents an alpha function of postsynaptic response, where $\tau_\alpha$—represents time constant (3 ms). A probabilistic part of a neuron may be introduced using the exponential probabilistic threshold. Instantaneous probability of firing $\lambda(t)$ may be calculated as $\lambda(t)=e^{(v(t)-Th)\kappa}$, where Th—represents a threshold value, and $\kappa$ represents stochasticity parameter within the control block. State variables q (only probability of firing $\lambda(t)$ for this system),) associated with the control model may be provided to the learning block 720 via the pathway 705. The learning block 720 of the neuron 730 may receive the output spike train y(t) via the pathway 708_1. In one or more implementations (e.g., unsupervised or reinforcement learning), the learning block 720 may receive the input spike train as well (not shown). In one or more implementations (e.g., supervised or reinforcement learning) the learning block 720 may receive the learning signal, indicated by dashed arrow 704_1 in FIG. 7. The learning block determines adjustment of the learning parameters w, in accordance with any methodologies described herein, thereby enabling the neuron 730 to adjust, inter alia, parameters 712 of the connections 714.

Exemplary Methods

Figure 8A:
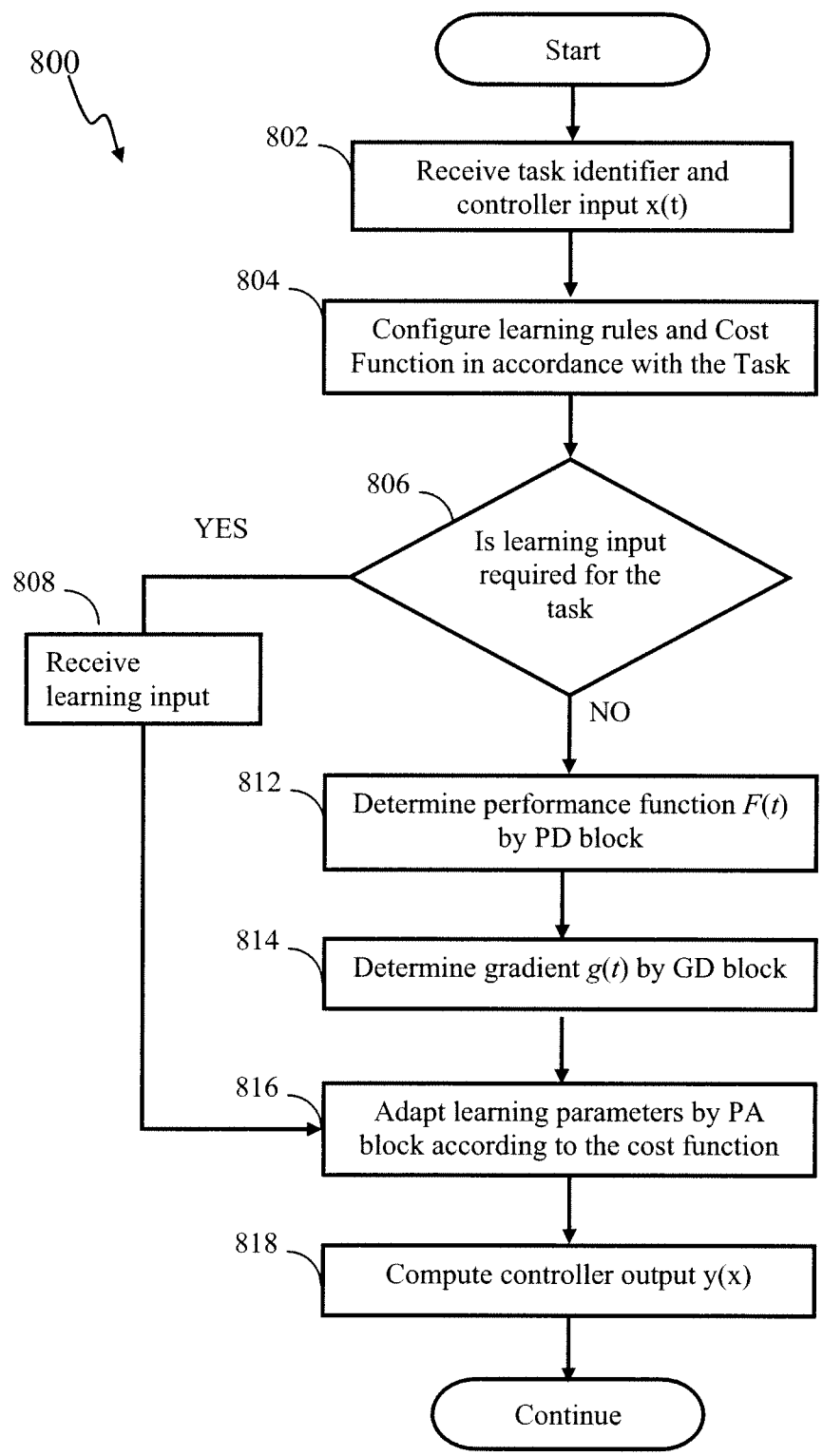
FIG. 8A is a logical flow diagram illustrating generalized learning method for use with the apparatus of FIG. 5A, in accordance with one or more implementations.
Figure 8:
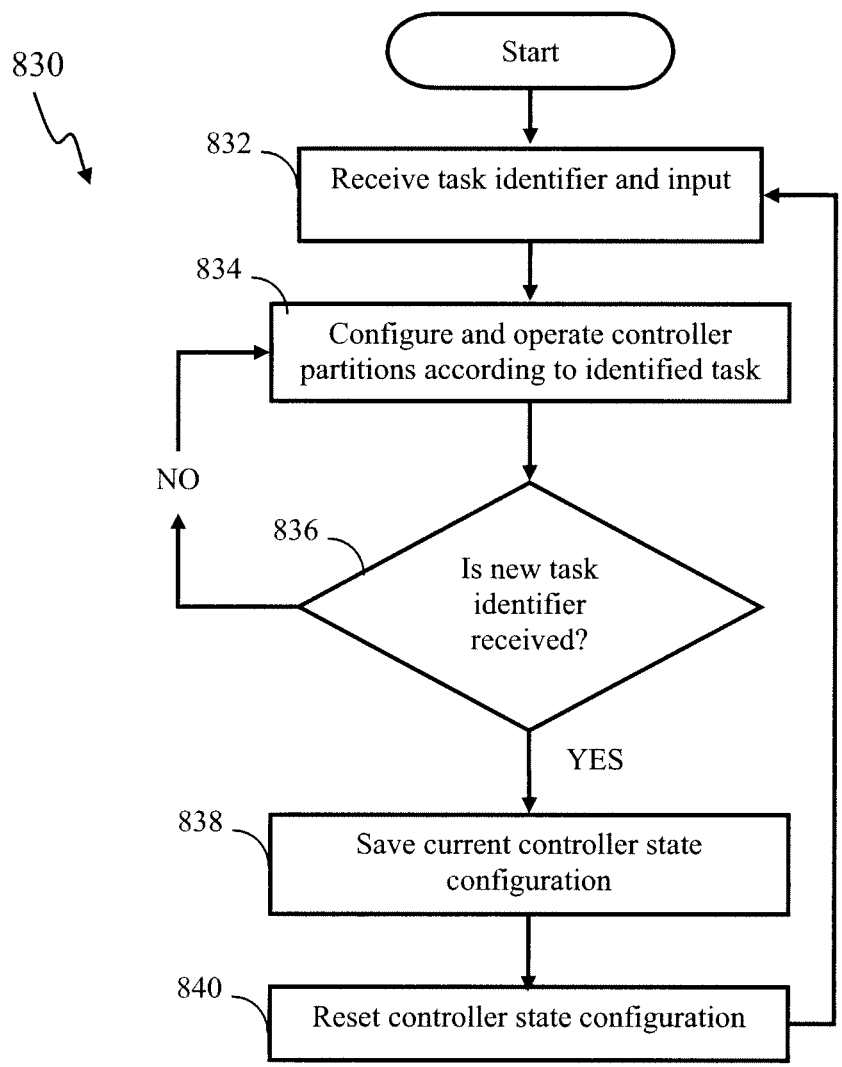
FIG. 8B is a logical flow diagram illustrating dynamic reconfiguration method for use with the apparatus of FIG. 5A, in accordance with one or more implementations.

Referring now to FIG. 8A one exemplary implementation of the generalized learning method of the disclosure for use with, for example, the learning block 420 of FIG. 4, is described in detail. The method 800 of FIG. 8A may allow the learning apparatus to: (i) implement different learning rules (supervised, unsupervised, reinforcement); and (ii) simultaneously support more than one rule (i.e., combination of supervised, unsupervised, reinforcement rules described, for example by Eqn. 18) using the same hardware/software configuration.

At step 802 of method 800 the input information may be received. In some implementations (e.g., unsupervised learning) the input information may comprise the input signal x(t), which may comprise raw or processed sensory input, input from the user, and/or input from another part of the adaptive system. In one or more implementations, the input information received at step 802 may comprise learning task identifier configured to indicate the learning rule configuration (e.g., Eqn. 18) that should be implemented by the learning block. In some implementations, the indicator may comprise a software flag transited using a designated field in the control data packet. In some implementations, the indicator may comprise a switch (e.g., effectuated via a software commands, a hardware pin combination, or memory register).

At step 804, learning framework of the performance determination block (e.g., the block 424 of FIG. 4) may be configured in accordance with the task indicator. In one or more implementations, the learning structure may comprise, inter alia, performance function configured according to Eqn. 18. In some implementations, parameters of the control block, e.g., number of neurons in the network, may be configured as well.

At step 808, the status of the learning indicator may be checked to determine whether additional learning input may be provided. In some implementations, the additional learning input may comprise reinforcement signal r(t). In some implementations, the additional learning input may comprise desired output (teaching signal) $y^d(t)$, described above with respect to FIG. 4.

If instructed, the external learning input may be received by the learning block at step 808.

At step 812, the value of the present performance may be computed using the performance function F(x,y,r) configured at the prior step. It will be appreciated by those skilled in the arts, that when performance function is evaluated for the first time (according, for example to Eqn. 10) and the controller output y(t) is not available, a pre-defined initial value of y(t) (e.g., zero) may be used instead.

At step 814, gradient g(t) of the score function (logarithm of the conditional probability of output) may be determined according by the GD block (e.g., The block 422 of FIG. 4) using methodology described, for example, in co-owned and co-pending U.S. patent application Ser. No. 13/487,533 entitled "SYSTEMS AND APPARATUS FOR IMPLEMENTING TASK-SPECIFIC LEARNING USING SPIKING NEURONS", incorporated supra.

At step 816, learning parameter w update may be determined by the Parameter Adjustment block (e.g., block 426 of FIG. 4) using the performance function F and the gradient g, determined at steps 812, 814, respectively. In some implementations, the learning parameter update may be implemented according to Eqns. 22-31. The learning parameter update may be subsequently provided to the control block (e.g., block 310 of FIG. 3).

At step 818, the control output y(t) of the controller may be updated using the input signal x(t) (received via the pathway 820) and the updated learning parameter Δw.

FIG. 8B illustrates a method of dynamic controller reconfiguration based on learning tasks, in accordance with one or more implementations.

At step 822 of method 830, the input information may be received. As described above with respect to FIG. 8A, in some implementations, the input information may comprise the input signal x(t) and/or learning task identifier configured to indicate the learning rule configuration (e.g., Eqn. 18) that should be implemented buy the learning block.

At step 834, the controller partitions (e.g., the partitions 520_6, 520_7, 520_8, 520_9, of FIG. 5B, and/or partitions 610, 620, 630 of FIG. 6A) may be configured in accordance with the learning rules (e.g., supervised, unsupervised, reinforcement, and/or any combination thereof) corresponding to the task received at step 832. Subsequently, individual partitions may be operated according to, for example, the method 800 described with respect to FIG. 8A.

At step 836, a check may be performed whether the new task (or task assortment) is received. If no new tasks are received, the method proceeds to step 834. If new tasks are received that require controller repartitioning, such as for example, when exploration robotic device may need to perform visual recognition tasks when stationary, the method proceeds to step 838.

At step 838, current partition configuration (e.g., input parameter, state variables, neuronal composition, connection map, and/or learning parameter values and rules) may be saved in a nonvolatile memory.

At step 840, the controller state and partition configurations may reset and the method proceeds to step 832, where a new partition set may be configured in accordance with the new task assortment received at step 836. Method 800 of FIG. 8B may enable, inter alia, dynamic partition reconfiguration as illustrated in FIGS. 5B, 6A-6B, supra.

Performance Results

FIGS. 9A through 11 present performance results obtained during simulation and testing by the Assignee hereof, of exemplary computerized spiking network apparatus configured to implement generalized learning framework described above with respect to FIGS. 3-6B. The exemplary apparatus, in one implementation, comprises learning block (e.g., the block 420 of FIG. 4) that implemented using spiking neuronal network 700, described in detail with respect to FIG. 7, supra.

The average performance (e.g. the function $\langle F \rangle_{x,y,r}$ of Eqn. 2 is determined over a time interval Tav that is configured in accordance with the specific application. In one or more implementations, the Tav is configured to exceed the rate of output y(t) by a factor of 5 to 1000. The data described below with respect to FIGS. 9A through 11 are obtained using performance optimization comprising maximization of the average performance function $\langle F \rangle_{x,y,r}$.

Combined Supervised and Reinforcement Learning Tasks

In some implementations, in accordance with the framework described by, inter alia, Eqn. 18, the cost function $F_{sr}$, corresponding to a combination of supervised and reinforcement learning tasks, may be expressed as follows:

$$F_{sr} = aF_{sup} + bF_{reinf},$$

where $F_{sup}$ and $F_{reinf}$ are the cost functions for the supervised and reinforcement learning tasks, respectively, and a,b are coefficients determining relative contribution of each cost component to the combined cost function. By varying the coefficients a,b during different simulation runs of the spiking network, effects of relative contribution of each learning method on the network learning performance are investigated.

In some implementations, such as those involving classification of spiking input patterns derived from speech data in order to determine speaker identity, the supervised learning cost function may comprise a product of the desired spiking pattern $y^d(t)$ (belonging to a particular speaker) with filtered output spike train y(t). In some implementations, such as those involving a low pass exponential filter kernel, the $F_{sup}$ may be computed using the following expression:

$$F_{sup} = \int_{-\infty}^{t} (y(s)e^{-(t-s)/\tau_d} ds)(y^d(t) - C), \quad \text{(Eqn. 30)}$$

where $\tau_d$ is the trace decay constant, C is the bias constant configured to introduce penalty associated with extra activity of the neuron that does not correspond to the desired spike train.

The cost function for reinforcement learning may be determined as a sum of positive and negative reinforcement contributions that are received by the neuron via two spiking channels ($y^+(t)$ and $y^-(t)$):

$$F_{reinf} = y^+(t) - y^-(t), \quad \text{(Eqn. 31)}$$

where the subtraction of spike trains may be understood as in Eqn. 32. Reinforcement may be generated according to the task that is being solved by the neuron.

A composite cost function for simultaneous reinforcement and supervised learning may be constructed using a linear combination of contributions provided by Eqn. 30-Eqn. 31:

$$F = aF_{sup} + bF_{reinf} = \qquad (Eqn. 32)$$
$$= a \int_{-\infty}^{t} \left( \sum_i \delta(t-t_i) e^{-(t-s)/\tau_d} ds \right) \left( \sum_i \delta(t-t_i^d) dt - C \right) +$$
$$b \left( \sum_j \delta(t-t_j^+) dt - \sum_j \delta(t-t_j^-) dt \right)$$

Using the description of Eqn. 32, the spiking neuron network (e.g., the network 700 of FIG. 7) may be configured to maximize the combined cost function $F_{sr}$ using any of the methodologies described in a co-owned and co-pending U.S. patent application entitled "APPARATUS AND METHODS FOR IMPLEMENTING LEARNING RULES USING PROBABILISTIC SPIKING NEURAL NETWORKS" filed contemporaneously herewith, and incorporated supra.

Figure 9A:
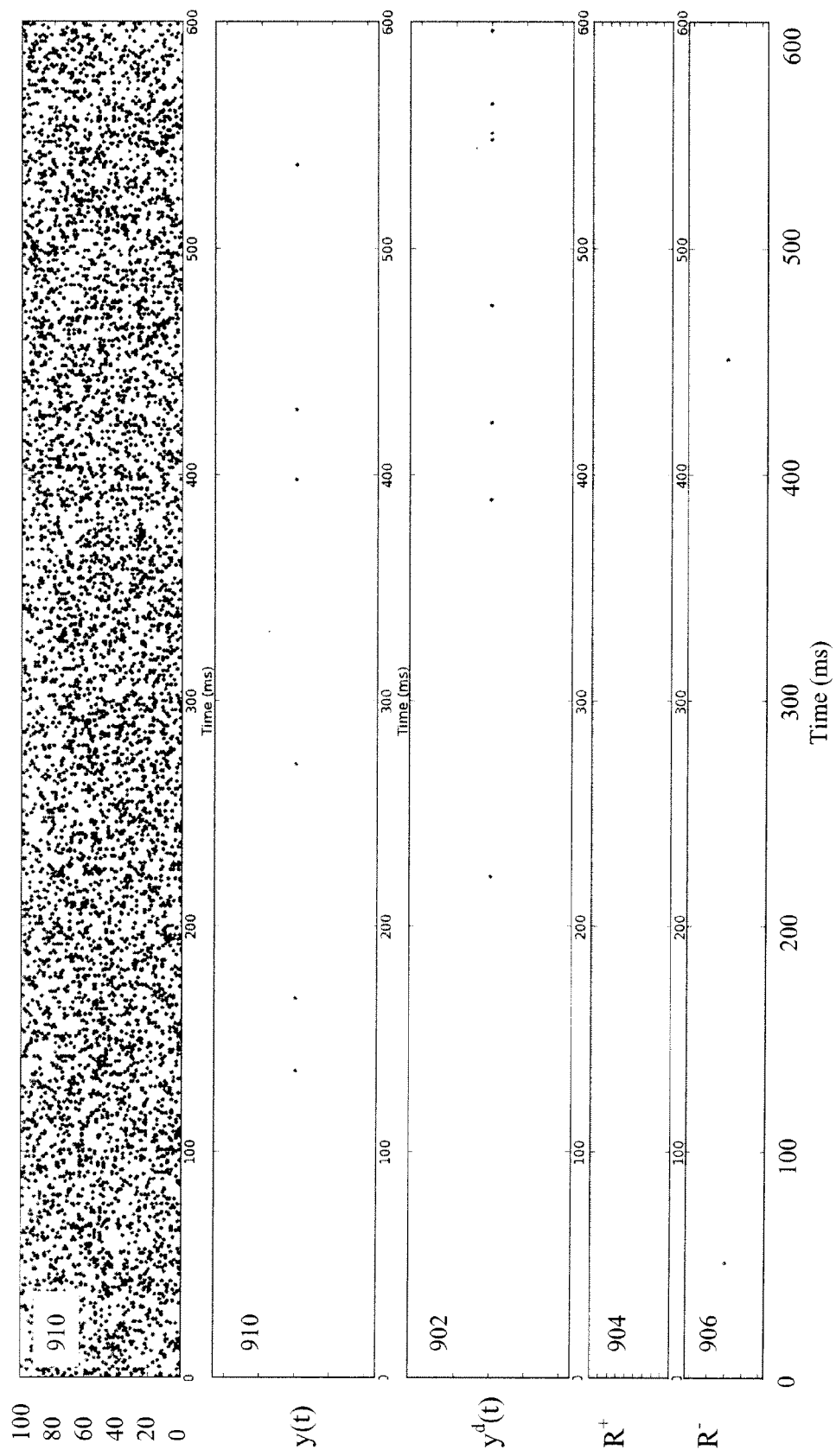
FIG. 9A is a plot presenting simulations data illustrating operation of the neural network of FIG. 7 prior to learning, in accordance with one or more implementations, where data in the panels from top to bottom comprise: (i) input spike pattern; (ii) output activity of the network before learning; (iii) supervisor spike pattern; (iv) positive reinforcement spike pattern; and (v) negative reinforcement spike pattern.

FIGS. 9A-9F present data related to simulation results of the spiking network (e.g., the network 700 of FIG. 7) configured in accordance with supervised and reinforcement rules described with respect to Eqn. 32, supra. The input into the network (e.g., the neuron 730 of FIG. 7) is shown in the panel 900 of FIG. 9A and may comprise a single 100-dimensional input spike stream of length 600 ms. The horizontal axis denotes elapsed time in ms, the vertical axis denotes each input dimension (e.g., the connection 714 in FIG. 7), each row corresponds to the respective connection, and dots denote individual spikes within each row. The panel 902 in FIG. 9A, illustrates supervisor signal, comprising a sparse 600 ms-long stream of training spikes, delivered to the neuron 730 via the connection 704, in FIG. 7. Each dot in the panel 902 denotes the desired output spike $y^d(t)$.

The reinforcement signal may be provided to the neuron according to the following protocol:

If the network (e.g., the network 700 of FIG. 7) generates one spike within a time window between 0 ms and 50 ms from the onset of pre-synaptic input, then it receives the positive reinforcement spike, illustrated in the panel 904 in FIG. 9A.

If the network does not generate outputs during that interval or generates more than one spike, then it receives negative reinforcement spike, illustrated in the panel 906 in FIG. 9A.

If the network is active (generates output spikes) during time intervals [200 ms, 250 ms] and [400 ms, 450 ms], then it receives negative reinforcement spike.

Reinforcement signals are not generated during all other intervals.

A maximum reinforcement configuration may comprise: (i) one positive reinforcement spike and (ii) no negative reinforcement spikes, while a maximum negative reinforcement configuration may comprise (i) no positive reinforcement spikes, and (ii) three negative reinforcement spikes.

The output activity (e.g., the post-synaptic spikes y(t)) of the network 660 prior to learning, illustrated in the panel 910 of FIG. 9A, shows that output 910 comprises few output spikes generated at random times that do not display substantial correlation with the supervisor input 902. The reinforcement signals 904, 906 show that the untrained neuron does not receive positive reinforcement (manifested by the absence of spikes in the panel 904) and receives two spikes of negative reinforcement (shown by the dots at about 50 ms and about 450 ms in the panel 906) because the neuron is quiet during [0 ms-50 ms] interval and it spikes during [400 ms-450 ms] interval.

Figure 9B:
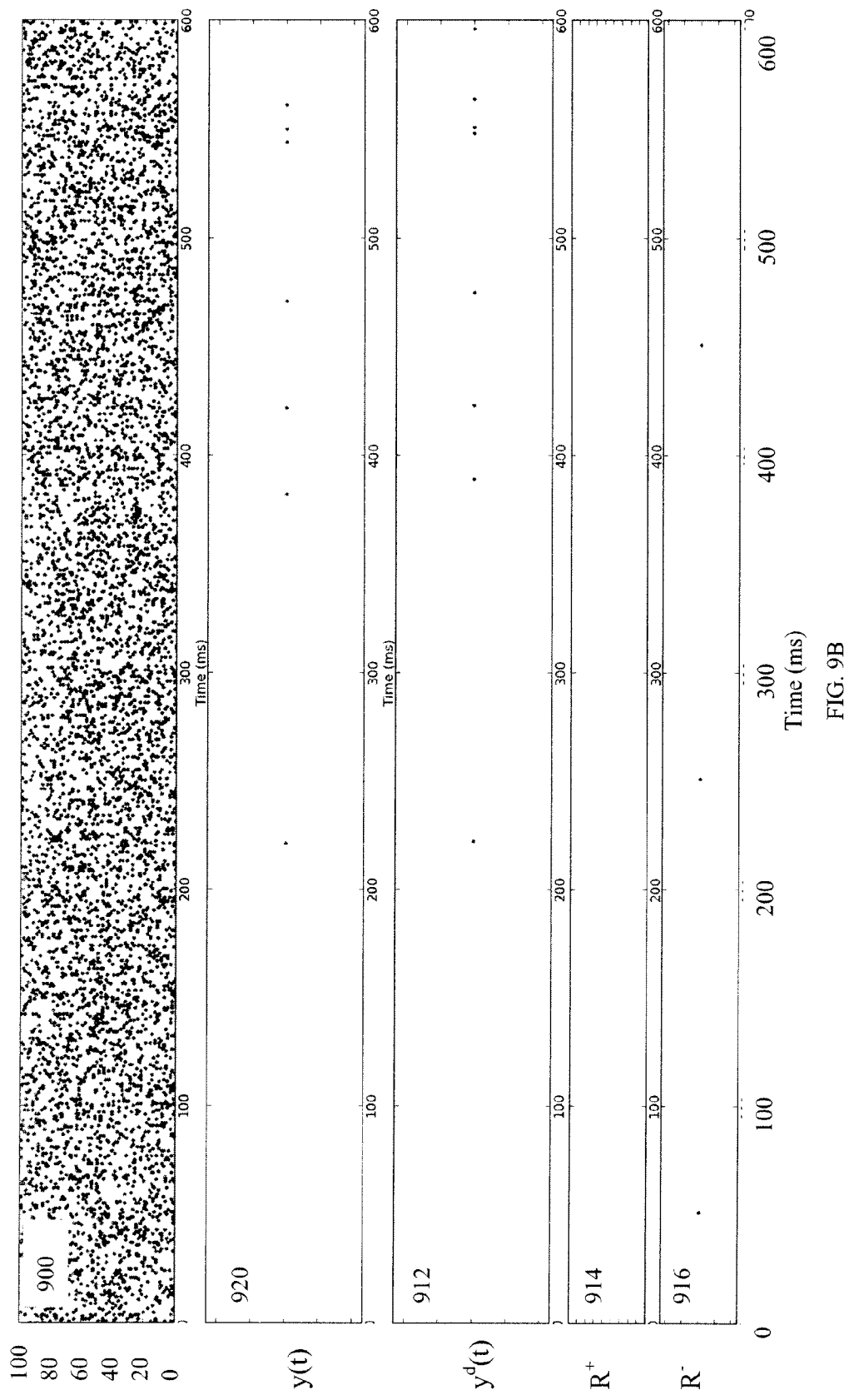
FIG. 9B is a plot presenting simulations data illustrating supervised learning operation of the neural network of FIG. 7, in accordance with one or more implementations, where data in the panels from top to bottom comprise: (i) input spike pattern; (ii) output activity of the network before learning; (iii) supervisor spike pattern; (iv) positive reinforcement spike pattern; and (v) negative reinforcement spike pattern.

FIG. 9B illustrates output activity of the network 700, operated according to the supervised learning rule, which is effected by setting the coefficients (a,b) of Eqn. 32 as follows: a=1, b=0. Different panels in FIG. 9B present the following data: panel 900 depicts pre-synaptic input into the network 700 of FIG. 7; panel 912 depicts supervisor (training) spiking input; panels 914, 916 depict positive and negative reinforcement input spike patterns, respectively.

The output of the network shown in the panel 910 displays a better correlation (compared to the output 910 in FIG. 9A) of the network with the supervisor input. Data shown in FIG. 9B confirm that while the network learns to repeat the supervisor spike pattern it fails to perform reinforcement task (receives 3 negative spikes—maximum possible reinforcement).

Figure 9C:
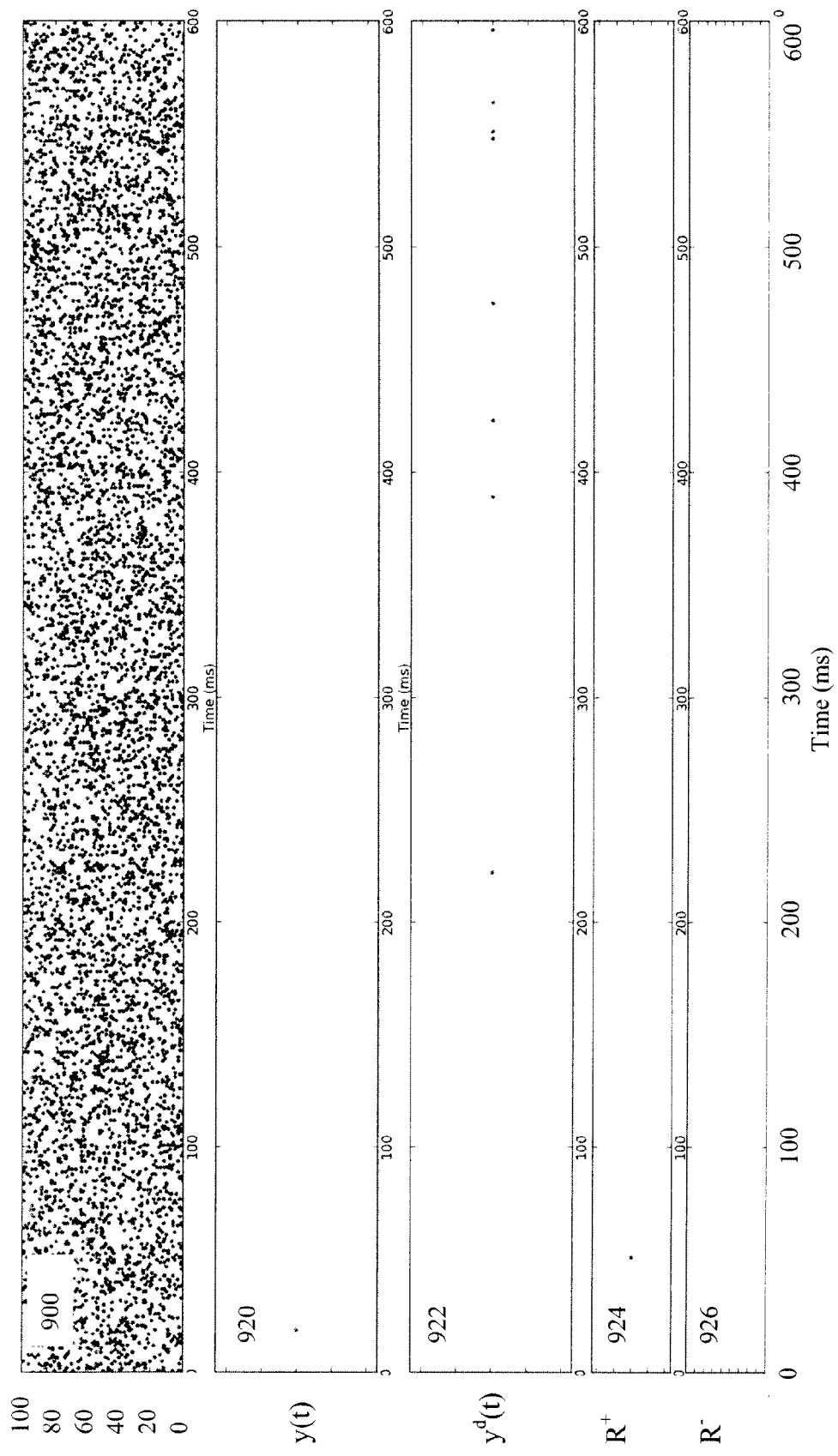
FIG. 9C is a plot presenting simulations data illustrating reinforcement learning operation of the neural network of FIG. 7, in accordance with one or more implementations, where data in the panels from top to bottom comprise: (i) input spike pattern; (ii) output activity of the network after learning; (iii) supervisor spike pattern; (iv) positive reinforcement spike pattern; and (v) negative reinforcement spike pattern.

FIG. 9C illustrates output activity of the network, operated according to the reinforcement learning rule, which is effected by setting the coefficients (a,b) of Eqn. 32 as follows: a=0, b=1. Different panels in FIG. 9C present the following data: panel 900 depicts pre-synaptic input into the network; panel 922 depicts supervisor (training) spiking input; panels 924, 926 depict positive and negative reinforcement input spike patterns, respectively.

The output of the network, shown in the panel 920, displays no visible correlation with the supervisor input, as expected. At the same time, network receives maximum possible reinforcement (one positive spike and no negative spikes) illustrated by the data in panels 924, 926 in FIG. 9C.

Figure 9D:
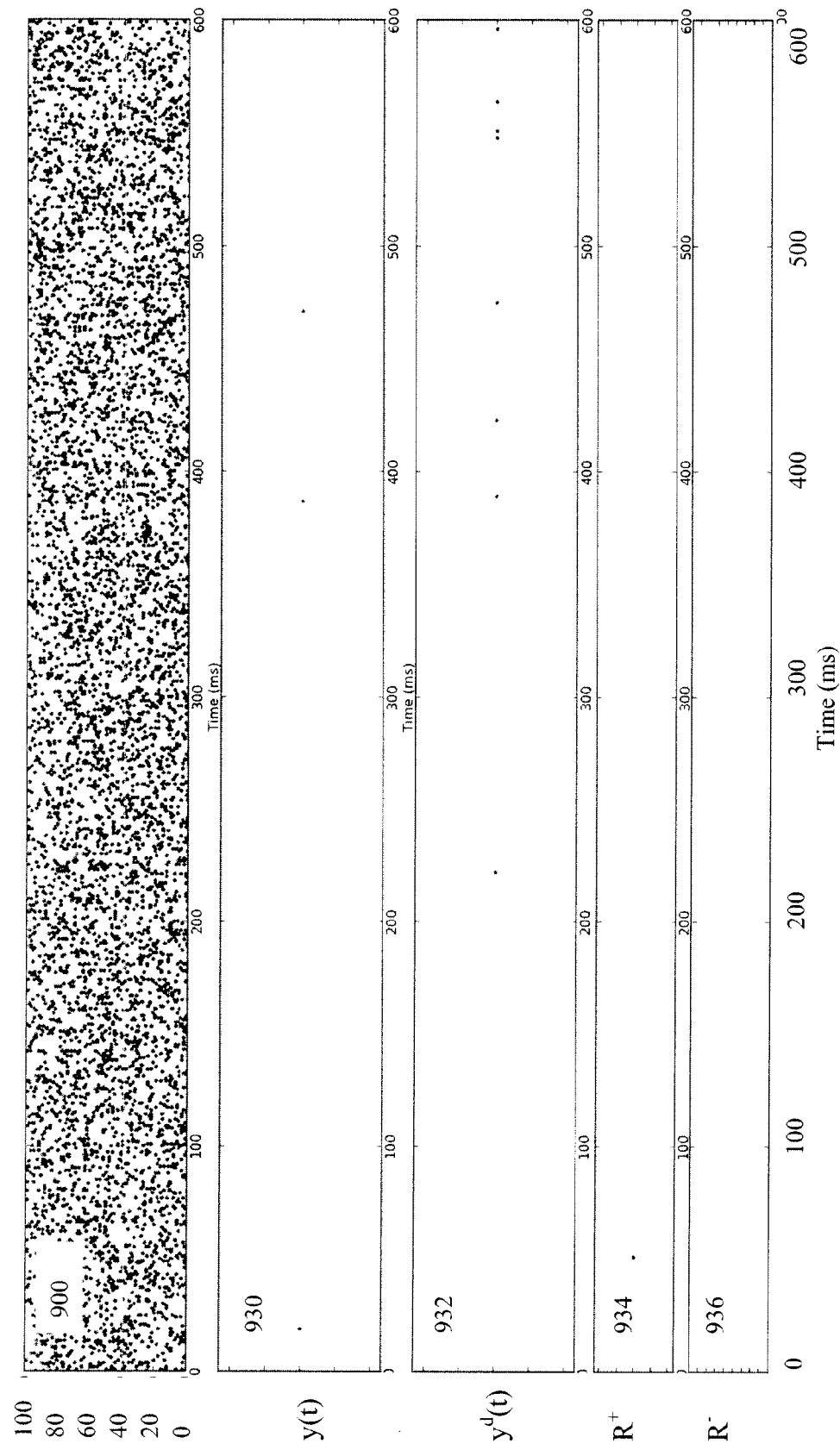
FIG. 9D is a plot presenting simulations data illustrating operation of the neural network of FIG. 7, comprising reinforcement learning aided with small portion of supervisor spikes, in accordance with one or more implementations, where data in the panels from top to bottom comprise: (i) input spike pattern; (ii) output activity of the network after learning; (iii) supervisor spike pattern; (iv) positive reinforcement spike pattern; and (v) negative reinforcement spike pattern.

FIG. 9D illustrates output activity of the network 700, operated according to the reinforcement learning rule augmented by the supervised learning, effected by setting the coefficients (a,b) of Eqn. 32 as follows: a=0.5, b=1. Different panels in FIG. 9D present the following data: panel 900 depicts pre-synaptic input into the network; panel 932 depicts supervisor (training) spiking input; panels 934, 936 depict positive and negative reinforcement input spike patterns, respectively.

The output of the network shown in the panel 930 displays a better correlation (compared to the output 910 in FIG. 9A) of the network with the supervisor input. Data presented in FIG. 9D show that network receives maximum possible reinforcement (panel 934, 936) and begins starts to reproduce some of the supervisor spikes (at around 400 ms and 470 ms) when these do not contradict with the reinforcement learning signals. However, not all of the supervised spikes are echoed in the network output 930, and additional spikes are present (e.g., the spike at about 50 ms), compared to the supervisor input 932.

Figure 9E:
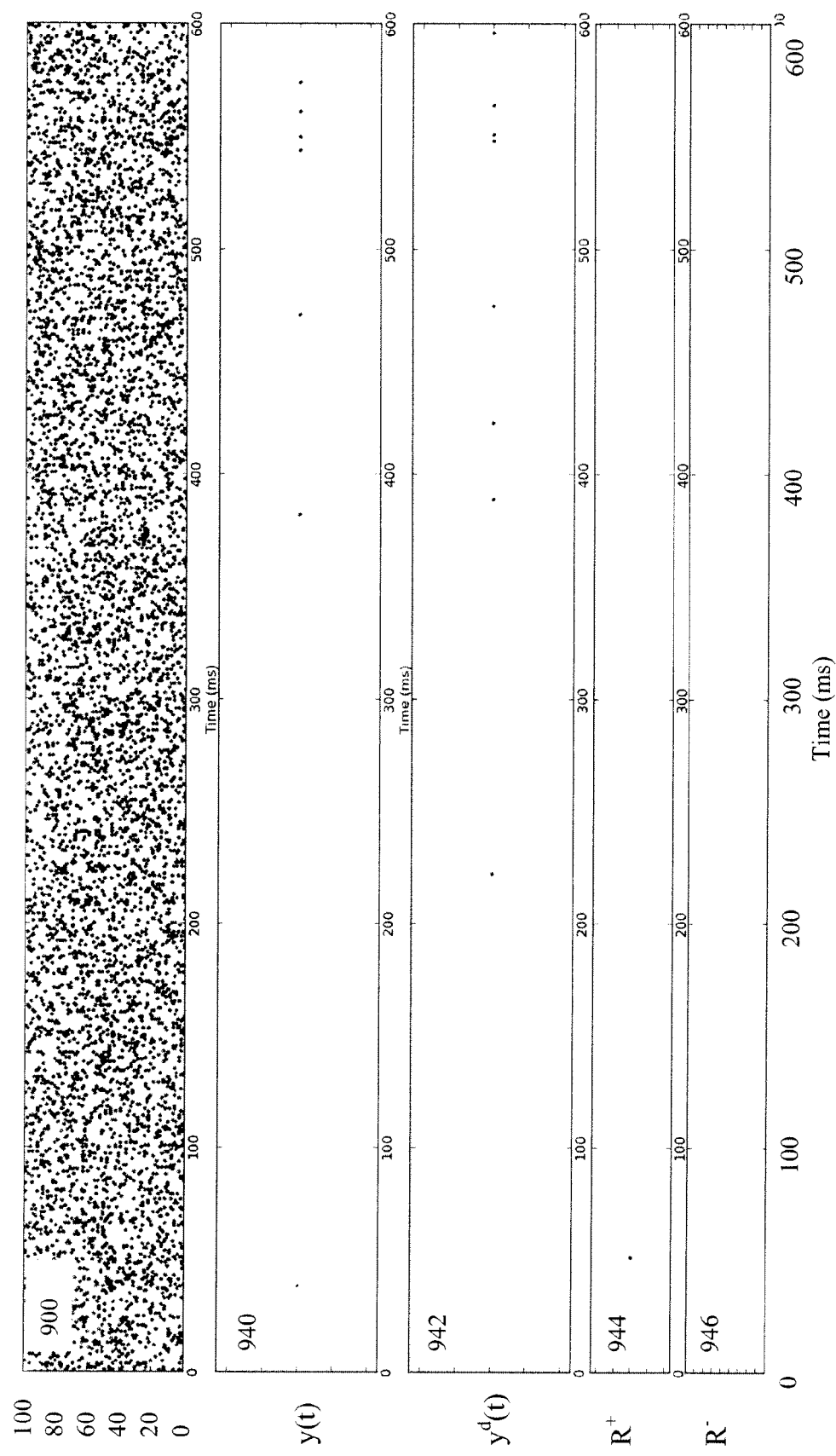
FIG. 9E is a plot presenting simulations data illustrating operation of the neural network of FIG. 7, comprising an equal mix of reinforcement and supervised learning signals, in accordance with one or more implementations, where data in the panels from top to bottom comprise: (i) input spike pattern; (ii) output activity of the network after learning; (iii) supervisor spike pattern; (iv) positive reinforcement spike pattern; and (v) negative reinforcement spike pattern.

FIG. 9E illustrates data obtained for an equal weighting of supervised and reinforcement learning: (a=1; b=1 in of Eqn. 32). The reinforcement traces 944, 946 of FIG. 9E show that the network receives maximum reinforcement. The network output (trace 940) contains spikes corresponding to a larger portion of the supervisor input (the trace 942) when compared to the data shown by the trace 930 of FIG. 9E, provided the supervisor input does not contradict the reinforcement input. However, not all of the supervised spikes of FIG. 9E are echoed in the network output 940, and additional spikes are present (e.g., the spike at about 50 ms), compared to the supervisor input 942.

Figure 9F:
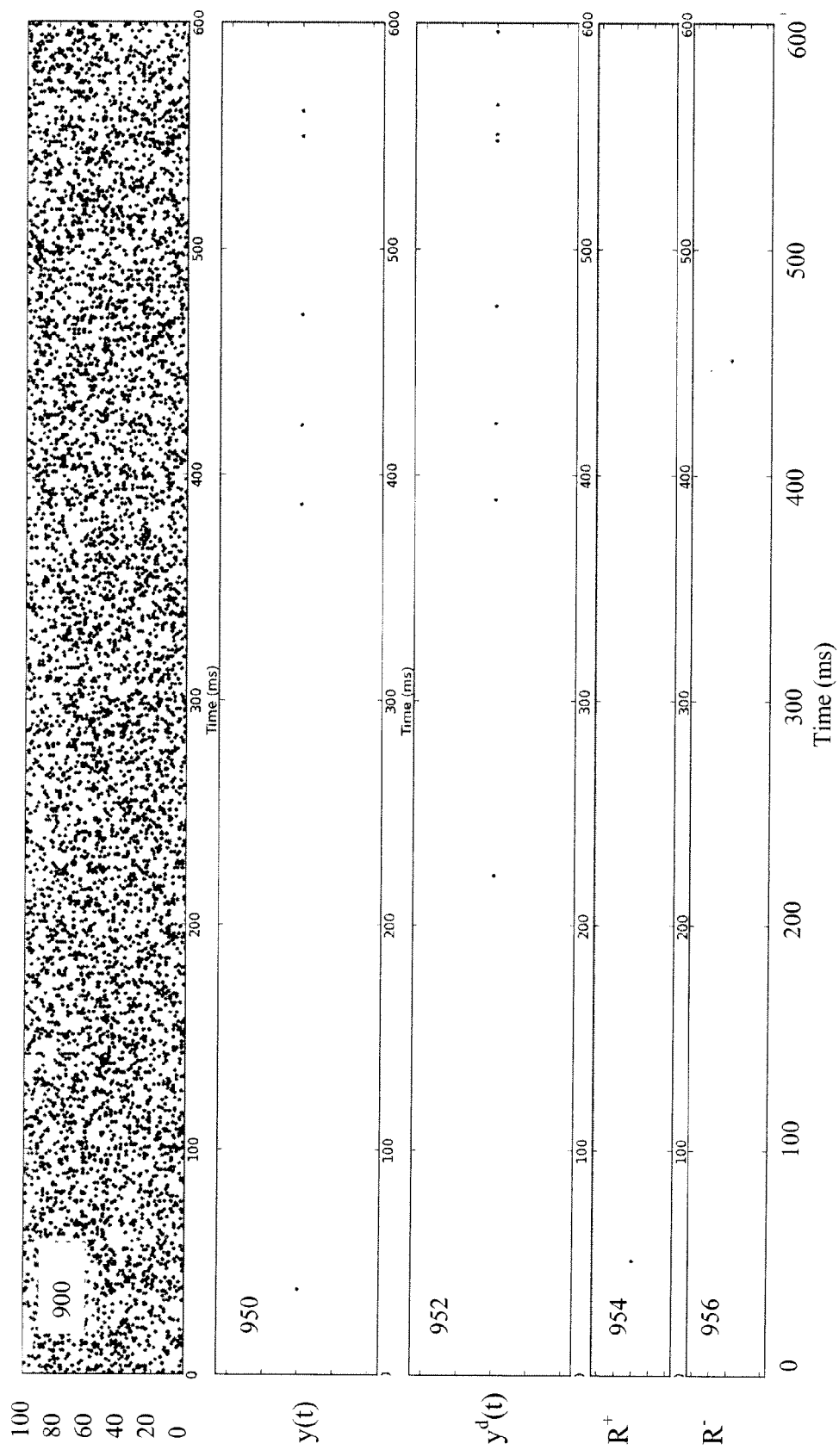
FIG. 9F is a plot presenting simulations data illustrating operation of the neural network of FIG. 7, comprising supervised learning augmented with a 50% fraction of reinforcement spikes, in accordance with one or more implementations, where data in the panels from top to bottom comprise: (i) input spike pattern; (ii) output activity of the network after learning; (iii) supervisor spike pattern; (iv) positive reinforcement spike pattern; and (v) negative reinforcement spike pattern.

FIG. 9F illustrates output activity of the network, operated according to the supervised learning rule augmented by the reinforcement learning, effected by setting the coefficients (a,b) of Eqn. 32 as follows: a=1, b=0.4. The output of the network shown in the panel 950 displays a better correlation with the supervisor input (the panel 952), as compared to the output 940 in FIG. 9E. The network output (950) is shown to repeat the supervisor input (952) event when the latter contradicts with the reinforcement learning signals (traces 954, 956). The reinforcement data, 956) of FIG. 9F show that while the network receive maximum possible reinforcement (trace 954), it is penalized (negative spike at 450 ms on trace 956) for generating output that is inconsistent with the reinforcement rules.

Combined Supervised and Unsupervised Learning Tasks

In another implementation, in accordance with the framework described by, inter alia, Eqn. 18, the cost function $F_{su}$, corresponding to a combination of supervised and unsupervised learning tasks, may be expressed as follows:

$$F_{su} = aF_{sup} + c(-F_{unsup}).\qquad\text{(Eqn. 33)}$$

where $F_{sup}$ is described by, for example, Eqn. 9 and $F_{unsup}$ is the cost function for the unsupervised learning tasks, and a,c are coefficients determining relative contribution of each cost component to the combined cost function. By varying the coefficients a,c during different simulation runs of the spiking network, the effects of relative contribution of individual learning methods on the network learning performance may be investigated.

In order to describe the cost function of the unsupervised learning, an instantaneous Kullback-Leibler divergence between two point processes may be used:

$$F_{unsup} = \ln(p(t)) - \ln(p^d(t))\qquad\text{(Eqn. 34)}$$

where p(t) is probability of the actual spiking pattern generated by the network, and $p^d(t)$ is probability of the same spiking pattern generated by Poisson process. The unsupervised learning task in this implementation may serve to minimize the function of Eqn. 34 such that when the two probabilities $p(t)=p^d(t)$ are equal at all times, then the network generates output spikes according to Poisson distribution.

Accordingly, the composite cost function for simultaneous unsupervised and supervised learning may be expressed as a linear combination of Eqn. 30 and Eqn. 34:

$$F = aF_{sup} + c(-F_{unsup})\qquad\text{(Eqn. 35)}$$

$$= a\left[\int_{\infty}^{t}\left(\int_{\infty}^{s}\left(\sum_{i}\delta(t-t_i)e^{-\frac{t-s}{\tau_d}}ds\right)\sum_{i}\delta(t-t_i^d)dt\right) - C\right] +$$

$$c(\ln(p^d(t)) - \ln(p(t)))$$

Referring now to FIGS. 8A-8C, data related to simulation results of the spiking network 700 may be configured in accordance with supervised and unsupervised rules described with respect to Eqn. 35, supra. The input into the neuron 730 is shown in the panel 1000 of FIG. 10A-10C and may comprise a single 100-dimensional input spike stream of length 600 ms. The horizontal axis denotes elapsed time in ms, the vertical axis denotes each input dimension (e.g., the connection 714 in FIG. 7), and dots denote individual spikes.

Figure 10A:
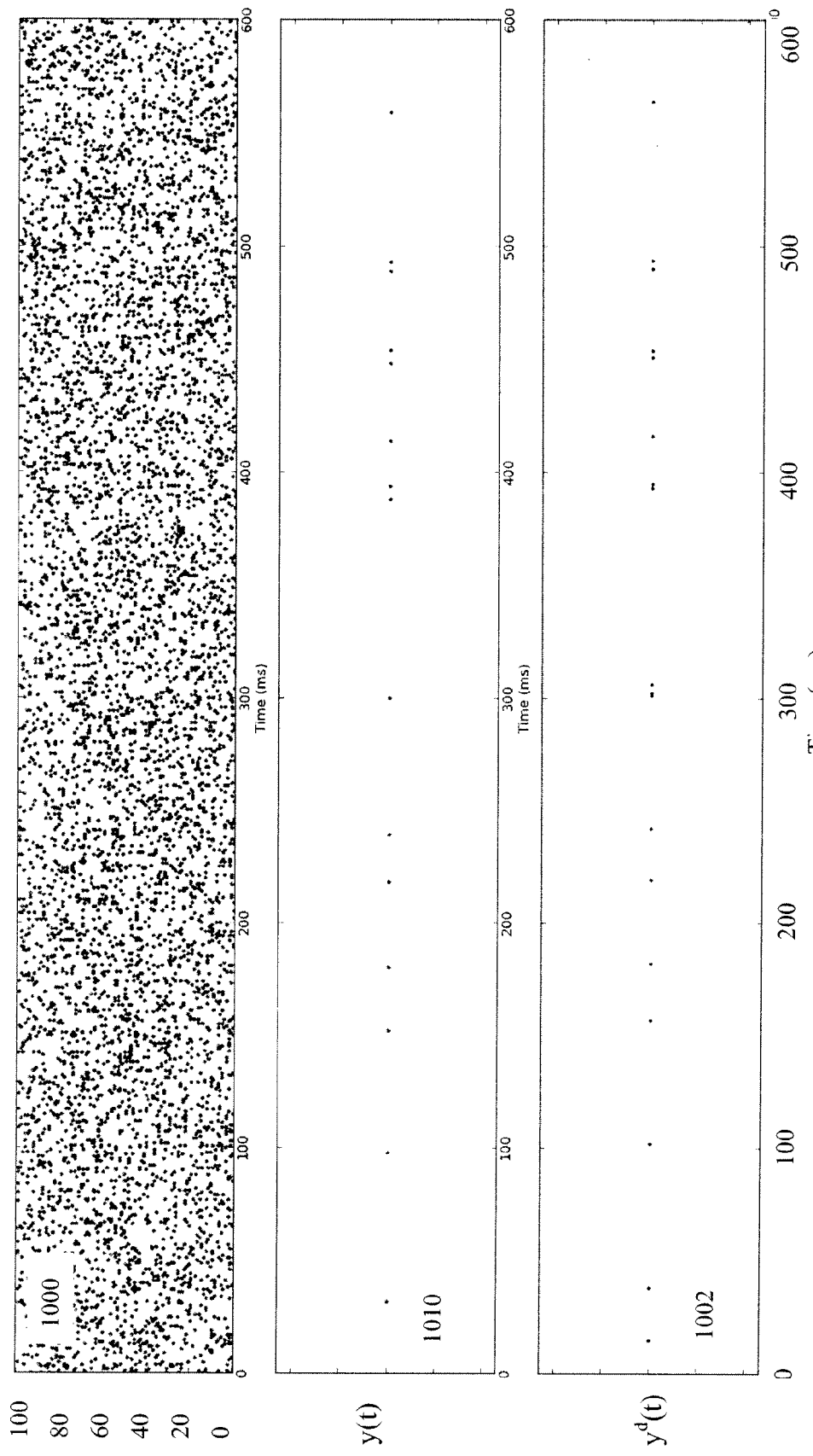
FIG. 10A is a plot presenting simulations data illustrating supervised learning operation of the neural network of FIG. 7, in accordance with one or more implementations, where data in the panels from top to bottom comprise: (i) input spike pattern; (ii) output activity of the network before learning; (iii) supervisor spike pattern.

FIG. 10A illustrates output activity of the network (e.g., network 700 of FIG. 7), operated according to the supervised learning rule, which is effected by setting the coefficients (a,c) of Eqn. 35 as follows: a=1, b=0. The panel 1002 in FIG. 10A, illustrates supervisor signal, comprising a sparse 600 ms-long stream of training spikes, delivered to the neuron 730 via the connection 704 of FIG. 7. Each dot in the panel 1002 denotes the desired output spike $y^d(t)$.

The output activity (the post-synaptic spikes y(t)) of the network, illustrated in the panel 1010 of FIG. 10A, shows that the network successfully repeats the supervisor spike pattern which does not behave as a Poisson process with 60 Hz firing rate.

Figure 10B:
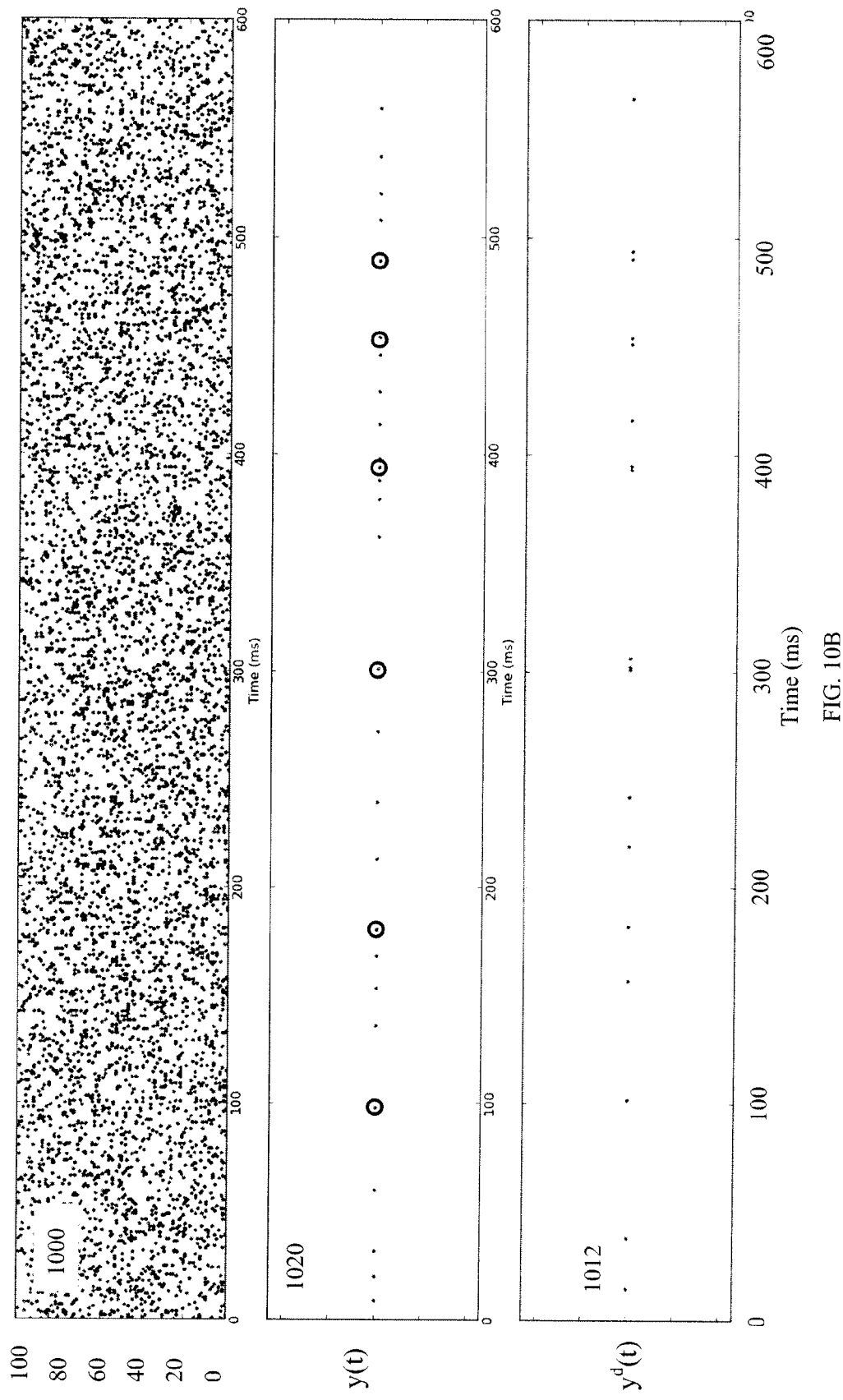
FIG. 10B is a plot presenting simulations data illustrating operation of the neural network of FIG. 7, comprising supervised learning augmented by a small amount of unsupervised learning, modeled as 15% fraction of randomly distributed (Poisson) spikes, in accordance with one or more implementations, where data in the panels from top to bottom comprise: (i) input spike pattern; (ii) output activity of the network after learning, (iii) supervisor spike pattern.

FIG. 10B illustrates output of the network, where supervised learning rule is augmented by 15% fraction of Poisson spikes, effected by setting the coefficients (a,c) of Eqn. 35 as follows: a=1, c=0.15. The output activity of the network, illustrated in the panel 1020 of FIG. 10B, shows that the network successfully repeats the supervisor spike pattern 1022 and further comprises additional output spikes are randomly distributed and the total number of spikes is consistent with the desired firing rate.

FIG. 10C illustrates output of the network 700, where supervised learning rule is augmented by 80% fraction of Poisson spikes, effected by setting the coefficients (a,c) of Eqn. 35 as follows: a=1, c=0.8. The output activity of the network 700, illustrated in the panel 1030 of FIG. 10B, shows that the network output is characterized by the desired Poisson distribution and the network tries to repeat the supervisor pattern, as shown by the spikes denoted with circles in the panel 1030 of FIG. 10C.

Combined Supervised, Unsupervised, and Reinforcement Learning Tasks

In some implementations, in accordance with the framework described by, inter alia, Eqn. 18, the cost function $F_{sur}$, representing a combination of supervised, unsupervised, and/or reinforcement learning tasks, may be expressed as follows:

$$F_{sur} = aF_{sup} + bF_{reinf} + c(-F_{unsup})\qquad\text{(Eqn. 36)}$$

Figure 11:
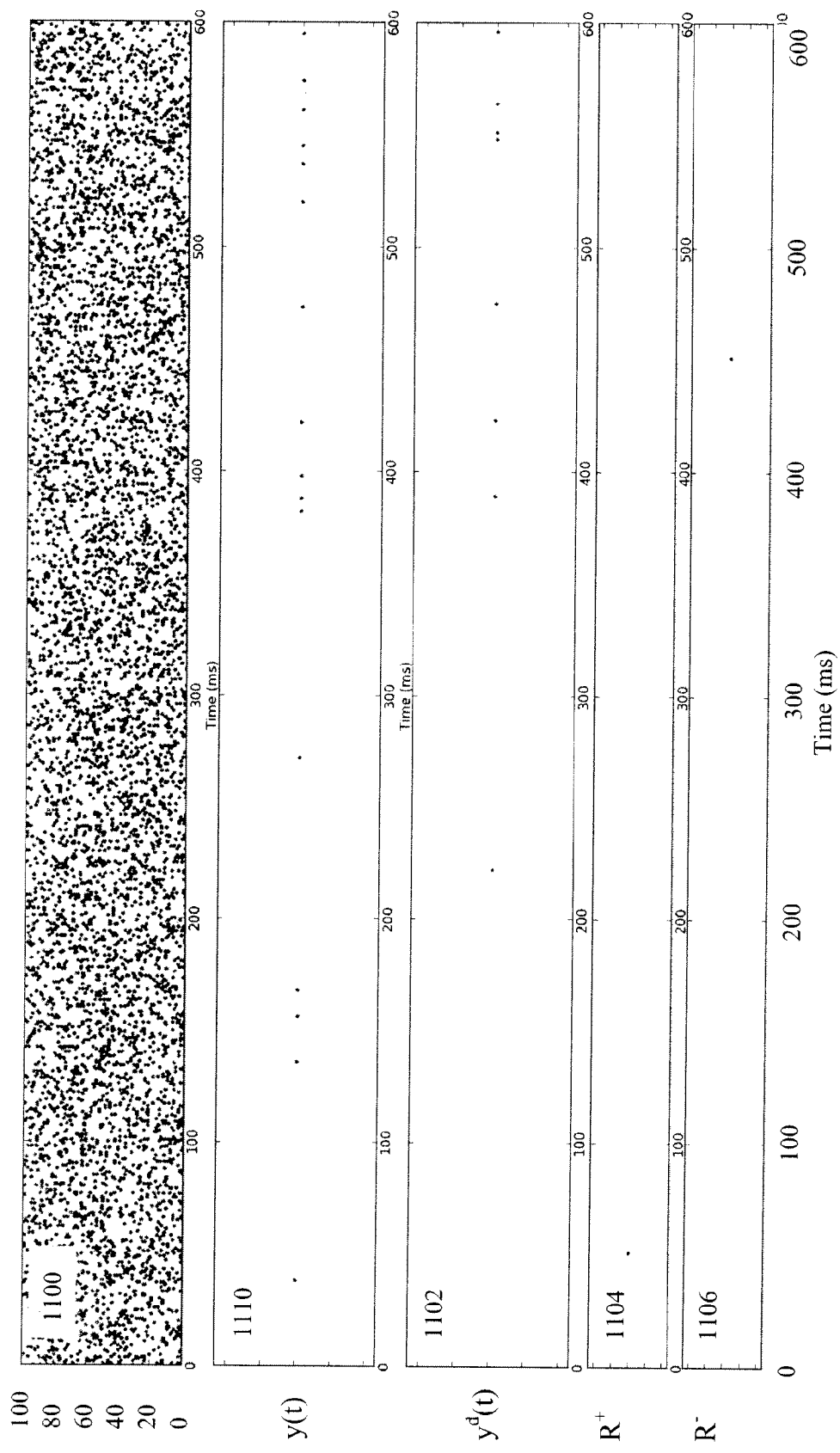
FIG. 11 is a plot presenting simulations data illustrating operation of the neural network of FIG. 7, comprising supervised learning and reinforcement learning, augmented by a small amount of unsupervised learning, modeled as 15% fraction of Poisson spikes, in accordance with one or more implementations, where data in the panels from top to bottom comprise: (i) input spike pattern; (ii) output activity of the network after learning, (iii) supervisor spike pattern; (iv) positive reinforcement spike pattern; and (v) negative reinforcement spike pattern.

Referring now to FIG. 11, data related to simulation results of the spiking network configured in accordance with supervised, reinforcement, and unsupervised rules described with respect to Eqn. 36, supra. The network learning rules comprise equally weight supervised and reinforcement rules augmented by a 15% fraction of Poisson spikes, representing unsupervised learning. Accordingly, the weight coefficients of Eqn. 36 are set as follows: a=1; b=1; c=0.1.

In FIG. 11, panel 1100 depicts the pre-synaptic input comprising a single 100-dimensional input spike stream of length 600 ms; panel 902 depicts the supervisor input; panels 904, 906 depict positive and negative reinforcement inputs into the network 700 of FIG. 7, respectively.

The network output, presented in panel 1110 in FIG. 11, comprises spikes that generated based on (i) reinforcement learning (the first spike at 50 ms leads to the positive reinforcement spike at 60 ms in the panel 1104); (ii) supervised learning (e.g., spikes between 400 ms and 500 ms interval); and (iii) random activity spikes due to unsupervised learning (e.g., spikes between 100 ms and 200 ms interval).

Exemplary Uses and Applications of Certain Aspects of the Invention

Generalized learning framework apparatus and methods of the disclosure may allow for an improved implementation of single adaptive controller apparatus system configured to simultaneously perform a variety of control tasks (e.g., adaptive control, classification, object recognition, prediction, and/or clusterisation). Unlike traditional learning approaches, the generalized learning framework of the present disclosure may enable adaptive controller apparatus, comprising a single spiking neuron, to implement different learning rules, in accordance with the particulars of the control task.

In some implementations, the network may be configured and provided to end users as a "black box". While existing approaches may require end users to recognize the specific learning rule that is applicable to a particular task (e.g., adaptive control, pattern recognition) and to configure network learning rules accordingly, a learning framework of the disclosure may require users to specify the end task (e.g., adaptive control). Once the task is specified within the framework of the disclosure, the "black-box" learning apparatus of the disclosure may be configured to automatically set up the learning rules that match the task, thereby alleviating the user from deriving learning rules or evaluating and selecting between different learning rules.

Even when existing learning approaches employ neural networks as the computational engine, each learning task is typically performed by a separate network (or network partition) that operate task-specific (e.g., adaptive control, classification, recognition, prediction rules, etc.) set of learning rules (e.g., supervised, unsupervised, reinforcement). Unused portions of each partition (e.g., motor control partition of a robotic device) remain unavailable to other partitions of the network even when the respective functionality of not needed (e.g., the robotic device remains stationary) that may require increased processing resources (e.g., when the stationary robot is performing recognition/classification tasks).

When learning tasks change during system operation (e.g., a robotic apparatus is stationary and attempts to classify objects), generalized learning framework of the disclosure may allow dynamic re-tasking of portions of the network (e.g., the motor control partition) at performing other tasks (e.g., visual pattern recognition, or object classifications tasks). Such functionality may be effected by, inter alia, implementation of generalized learning rules within the network which enable the adaptive controller apparatus to automatically use a new set of learning rules (e.g., supervised learning used in classification), compared to the learning rules used with the motor control task. These advantages may be traded for a reduced network complexity, size and cost for the same processing capacity, or increased network operational throughput for the same network size.

Generalized learning methodology described herein may enable different parts of the same network to implement different adaptive tasks (as described above with respect to FIGS. 5B-5C). The end user of the adaptive device may be enabled to partition network into different parts, connect these parts appropriately, and assign cost functions to each task (e.g., selecting them from predefined set of rules or implementing a custom rule). The user may not be required to understand detailed implementation of the adaptive system (e.g., plasticity rules and/or neuronal dynamics) nor is he required to be able to derive the performance function and determine its gradient for each learning task. Instead, the users may be able to operate generalized learning apparatus of the disclosure by assigning task functions and connectivity map to each partition.

Furthermore, the learning framework described herein may enable learning implementation that does not affect normal functionality of the signal processing/control system. By way of illustration, an adaptive system configured in accordance with the present disclosure (e.g., the network 600 of FIG. 6A or 700 of FIG. 7) may be capable of learning the desired task without requiring separate learning stage. In addition, learning may be turned off and on, as appropriate, during system operation without requiring additional intervention into the process of input-output signal transformations executed by signal processing system (e.g., no need to stop the system or change signals flow.

In one or more implementations, the generalized learning apparatus of the disclosure may be implemented as a software library configured to be executed by a computerized neural network apparatus (e.g., containing a digital processor). In some implementations, the generalized learning apparatus may comprise a specialized hardware module (e.g., an embedded processor or controller). In some implementations, the spiking network apparatus may be implemented in a specialized or general purpose integrated circuit (e.g., ASIC, FPGA, and/or PLD). Myriad other implementations may exist that will be recognized by those of ordinary skill given the present disclosure.

Advantageously, the present disclosure can be used to simplify and improve control tasks for a wide assortment of control applications including, without limitation, industrial control, adaptive signal processing, navigation, and robotics. Exemplary implementations of the present disclosure may be useful in a variety of devices including without limitation prosthetic devices (such as artificial limbs), industrial control, autonomous and robotic apparatus, HVAC, and other electromechanical devices requiring accurate stabilization, set-point control, trajectory tracking functionality or other types of control. Examples of such robotic devices may include manufacturing robots (e.g., automotive), military devices, and medical devices (e.g., for surgical robots). Examples of autonomous navigation may include rovers (e.g., for extraterrestrial, underwater, hazardous exploration environment), unmanned air vehicles, underwater vehicles, smart appliances (e.g., ROOMBA®), and/or robotic toys. The present disclosure can advantageously be used in all other applications of adaptive signal processing systems (comprising for example, artificial neural networks), including: machine vision, pattern detection and pattern recognition, object classification, signal filtering, data segmentation, data compression, data mining, optimization and scheduling, and/or complex mapping.

It will be recognized that while certain aspects of the disclosure are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the invention. This description is in no way meant to be limiting, but rather should be taken as illustrative of the general principles of the invention. The scope of the disclosure should be determined with reference to the claims.

What is claimed:

1. A stochastic signal processing system configured to implement task-specific learning, the system comprising:
a controller apparatus configured to generate an output control signal based on an input signal, the controller apparatus being characterized by a controller state parameter and a control parameter; and
a learning apparatus configured to:
generate an adjustment signal based on the input signal, the controller state parameter, and the output control signal; and
provide the adjustment signal to the controller apparatus, thereby effectuating learning;
wherein:
the control parameter is configured in accordance with a task;
the adjustment signal is configured to modify the control parameter based on the input signal and the output control signal;
the adjustment signal is determined as a product of a controller performance function with a gradient of a per-stimulus entropy parameter, the gradient being determined based on the control parameter;
the per-stimulus entropy parameter h is configured to characterize a dependence of the output control signal on (i) the input signal and (ii) the control parameter; and
the per-stimulus entropy parameter is determined based on a natural logarithm of p(y|x,w), where p denotes a conditional probability of the output control signal y given the input signal x with respect to the control parameter w.

2. The system of claim 1, wherein the output control signal is further based on the adjustment signal.

3. The system of claim 1, wherein the learning apparatus comprises:
a task-specific block, configured independent from the controller state parameter, the task-specific block configured to implement the task-specific learning; and
a controller-specific block, configured independent from the task-specific learning;
wherein the task-specific learning is characterized by a performance function, the performance function being configured to effect an unsupervised learning rule.

4. The system of claim 3, further comprising a teaching interface operably coupled to the learning apparatus and configured to provide a teaching signal;
wherein:
the teaching signal comprises a desired controller output signal; and
the performance function is further configured to effect a supervised learning rule, based on the desired controller output signal.

5. The system of claim 4, wherein:
the teaching signal further comprises a reinforcement signal associated with a current performance of the controller apparatus; and
the performance function is further configured to effect a reinforcement learning rule, based on the reinforcement signal.

6. The system of claim 5, wherein:
the current performance is based on adjustment of the control parameter w from a prior state to a current state;
the reinforcement signal is positive when the current performance is closer to a desired performance of the controller apparatus; and
the reinforcement signal is negative when the current performance is farther from the desired performance.

7. The system of claim 5, wherein the task-specific learning comprises a hybrid learning rule comprising a linear combination of the reinforcement learning rule, the supervised learning rule, and the unsupervised learning rule effected simultaneous with one another.

8. The system of claim 5, wherein the task-specific learning comprises a hybrid learning rule comprising a combination of the reinforcement learning rule, the unsupervised learning rule, and the supervised learning rule effected simultaneous with one another.

9. The system of claim 5, wherein the controller-specific block comprises:
a gradient determination block configured to determine a gradient; and
a parameter adaptation block configured to effect determination of the adjustment signal in accordance with a learning mode;
wherein the learning mode comprises any of (i) batch learning and (ii) online learning.

10. The system of claim 9, wherein the gradient determination block is configured to determine the gradient using any of (i) a gradient descend method, (ii) a gradient with momentum method, and (iii) a natural gradient method.

11. The system of claim 10, wherein:
the system is configured to operate in accordance with a stochastic model characterized by the control parameter; and
the stochastic model is configured such that the output control signal comprises a random distribution characterized by conditional probability with respect to the input signal.

12. The system of claim 1, wherein the learning is configured to aid the controller apparatus to generate the output control signal such as to attain a control measure within a required time interval.

13. The system of claim 12, wherein the provision of the adjustment signal is configured to reduce the time interval relative to the generation of the output control signal configured based on a fixed value of the control parameter.

14. A computerized apparatus configured to process input signal using a hybrid learning rule, the apparatus comprising:
a stochastic learning block configured to produce a learning signal based on an input signal and a training signal;
wherein:
the hybrid learning rule is configured to simultaneously effect a reinforcement learning rule and an unsupervised learning rule;
the hybrid learning rule is characterized by a learning parameter;
the training signal is determined based on a performance function and a gradient of a per-stimulus entropy parameter, the gradient being determined based on the learning parameter;
the per-stimulus entropy parameter is configured to characterize dependence of an output signal on the input signal; and
the per-stimulus entropy parameter is determined based on a natural logarithm of p(y|x,w), where p denotes a conditional probability of the output signal y given the input signal x with respect to the learning parameter w.

15. The apparatus of claim 14, wherein the hybrid learning rule is further configured to simultaneously effect the reinforcement learning rule, the unsupervised learning rule, and a supervised learning rule.

16. The apparatus of claim 14, wherein the stochastic learning block is operable according to a stochastic process characterized by a current state and a desired state, the stochastic process being described by a state variable configured to transition the learning block from the current state to the desired state.

17. The apparatus of claim 16, wherein:
the training signal r comprises a reinforcement indicator associated with a current performance of the apparatus, the current performance corresponding to the current state, and the desired state that corresponds to a desired performance of the apparatus;
the current performance is effected by a transition from a prior state to the current state; and
the reinforcement learning rule is configured to provide, based on the reinforcement indicator:
positive reinforcement when a distance measure between the current state and the desired state is smaller compared to the distance measure between the prior state and the desired state; and
negative reinforcement when the distance measure between the current state and the desired state is greater compared to the distance measure between the prior state and the desired state.

18. The apparatus of claim 17, wherein:
the training signal further comprises a desired output;
the current performance is effected by a transition from the prior state to the current state; and
the reinforcement learning rule is further configured to provide, based on the reinforcement indicator, the positive reinforcement when the current performance is closer to the desired performance.

19. The apparatus of claim 16, wherein:
the hybrid learning rule is characterized by a hybrid performance function comprising a simultaneous combination of a reinforcement learning performance function and an unsupervised learning performance function; and
the simultaneous combination is effectuated based on a value of the hybrid performance function determined at a time step, the value comprising the reinforcement performance function value and the unsupervised learning performance function value.

20. A method of implementing task-dependent hybrid learning, in a computerized signal processing apparatus, the method comprising:
operating the apparatus in accordance with a stochastic learning process characterized by a deterministic learning parameter, the stochastic learning process being configured based on an input signal x;
configuring a learning metric comprising a time-average of a task-specific performance function, the learning metric being configured to characterize a response of the stochastic learning process to (i) the input signal and (ii) a value of the deterministic learning parameter; and
applying the learning metric to the stochastic learning process to reduce an amount of time required to achieve a desired response by the apparatus to the input signal;
wherein:
the learning metric is further configured based on a gradient of a per-stimulus entropy parameter, the gradient being determined based on the deterministic learning parameter;
the per-stimulus entropy parameter is configured to characterize a dependence of the response on the input signal; and
the per-stimulus entropy parameter is determined based on a natural logarithm of $p(y|x,w)$, where p denotes conditional probability of the response y given the input signal x with respect to the deterministic learning parameter w.

21. The method of claim 20, wherein:
the response is configured to be updated at a response interval; and
the time average comprises a temporal average determined with respect to a time interval, the time interval being greater than the response interval.

22. The method of claim 21, wherein a ratio of the time interval to the response interval is in a range between 2 and 10000.

23. The method of claim 20, wherein the time average comprises a state-space average determined based on an ensemble comprising a plurality of input signals, the plurality of input signals being available to the apparatus contemporaneously with one another.

* * * * *